US007016184B1

(12) United States Patent
Oneyama et al.

(10) Patent No.: US 7,016,184 B1
(45) Date of Patent: Mar. 21, 2006

(54) ELECTRONIC DEVICE AND COVER MEMBER THEREOF

(75) Inventors: Wataru Oneyama, Fussa (JP); Kiyoshi Watanabe, Ome (JP); Hiroaki Aikyo, Hamura (JP)

(73) Assignee: Casio Computer Co., Ltd., Tokyo (JP)

( * ) Notice: Subject to any disclaimer, the term of this patent is extended or adjusted under 35 U.S.C. 154(b) by 171 days.

(21) Appl. No.: 10/669,521

(22) Filed: Sep. 24, 2003

(30) Foreign Application Priority Data

Sep. 27, 2002 (JP) ............................ 2002-282845
Sep. 27, 2002 (JP) ............................ 2002-282846

(51) Int. Cl.
*G06F 1/16* (2006.01)

(52) U.S. Cl. .................... 361/683; 312/223.2; 248/551

(58) Field of Classification Search ................ 361/683, 361/681; 312/223.1, 223.2; 248/551–553
See application file for complete search history.

(56) References Cited

U.S. PATENT DOCUMENTS 5,701,230 A * 12/1997 Liang et al. ................ 361/681
5,745,566 A 4/1998 Petrella et al.
5,768,370 A 6/1998 Maataa et al.
5,870,282 A * 2/1999 Andre et al. ................ 361/683
6,262,824 B1 * 7/2001 Sasaki et al. ............... 398/115
6,262,886 B1 * 7/2001 DiFonzo et al. ............ 361/683
6,301,100 B1 * 10/2001 Iwata ......................... 361/683
6,421,235 B1 * 7/2002 Ditzik ........................ 361/683
6,504,707 B1 * 1/2003 Agata et al. ................ 361/681
6,842,338 B1 * 1/2005 Iredale ....................... 361/683
2001/0009498 A1 * 7/2001 Oross et al. ................ 361/681

FOREIGN PATENT DOCUMENTS

JP 8-18641 A 1/1996
JP 11-53052 A 2/1999
KR 96-35767 A 11/1996
KR 2000-0044513 A 7/2000

* cited by examiner

*Primary Examiner*—Lisa Lea-Edmonds
(74) *Attorney, Agent, or Firm*—Frishauf, Holtz, Goodman & Chick, P.C.

(57) ABSTRACT

An electronic device includes two cases, a hinge unit which connects the two cases to each other and by which the two cases are openable and closeable, a cover member for decoration which is mounted on an outer surface of at least one of the two cases, a first engaging unit which is disposed in at least one of the cases, and a second engaging unit which is disposed in the cover member to be engaged with the first engaging unit. The cover member is detachably mounted on the outer surface of at least one of the cases by engaging the first and second engaging units with each other.

18 Claims, 28 Drawing Sheets

ELECTRONIC DEVICE AND COVER MEMBER THEREOF

CROSS-REFERENCE TO RELATED APPLICATIONS

This application is based upon and claims the benefit of priority from the prior Japanese Patent Applications No. 2002-282845, filed Sep. 27, 2002; and No. 2002-282846, filed Sep. 27, 2002, the entire contents of both of which are incorporated herein by reference.

BACKGROUND OF THE INVENTION

1. Field of the Invention

The present invention relates to an electronic device such as an electronic dictionary, a mobile telephone or a mobile terminal, and a cover member thereof.

2. Description of the Related Art

Conventionally, an electronic device of one of the above described types comprises a first case including a plurality of operation keys and a second case including a display unit, which are connected to each other by a hinge unit so as to be foldable. When it is carried, the device is made compact by overlapping the first case and the second case each other. When the device is used, the first case is held on a palm of an user, and the second case is opened. In order to clearly differentiate the first case and the second case from each other, the first case and the second case are colored differently.

In the electronic device in which the first case and the second case are colored differently, mistake holding of the second case is reduced even at a dark place so that an operability of the electronic device is improved. However, since the first and second cases of the electronic device have been colored in predetermined different colors when the electronic device is shipped, an user who obtains the electronic device cannot freely change the colors of the first and second cases. Further, in such an electronic device, only the colors are different between the first case and the second case, and design of a surface of each case cannot be changed in accordance with user's taste.

Additionally, to facilitate miniaturization, the electronic device is designed to perform only minimum necessary functions. However, it is preferable that more functions can be added to the electronic device to meet user's demand. In the conventional electronic device, to meet such a demand, a connector is disposed on one of the first and second cases, a cable is connected to the connector, and this cable is further connected to an auxiliary device for performing more functions. However, in such a conventional function addition structure, because of the connection between the case and the auxiliary device through the cable, when the electronic device together with the auxiliary device is used, the electronic device and the auxiliary device must both be held by both hands, or at least one of the electronic device and the auxiliary device must be placed on a table or the like. Thus, the conventional electronic device is not usable when it is used with the auxiliary device and the auxiliary device deteriorates mobility of the conventional electronic device.

Regarding the aforementioned conventional electronic device, a first problem to be solved by the present invention is that the colors or the design of the surfaces of the first and second cases cannot be freely changed in accordance with user's taste.

A second problem is that not only addition of functions is not easy but also the auxiliary device for performing more functions deteriorates mobility of the electronic device and usability thereof when the electronic device is used with the auxiliary device.

BRIEF SUMMARY OF THE INVENTION

According to an aspect of the invention, an electronic device comprises two cases, a hinge unit which connects the two cases to each other and by which the two cases are openable and closeable, a cover member for decoration which is mounted on an outer surface of at least one of the two cases, a first engaging unit which is disposed in at least one of the cases, and a second engaging unit which is disposed in the cover member to be engaged with the first engaging unit. And the cover member is detachably mounted on the outer surface of at least one of the cases by engaging the first and second engaging units with each other.

According to another aspect of the invention, a cover member which is mounted to an outer surface of at least one of two cases of an electronic device, the cases being connected to each other by a hinge unit by which the two cases are openable and closeable, comprises, an engaging unit which is detachably engaged with at least one of the cases. And, the cover member is detachably mounted on the outer surface of at least one of the cases by engaging the engaging unit with at least one of the cases.

According to further aspect of the invention, an electronic device comprises, two cases, a hinge unit which connects the two cases to each other and by which the two cases are openable and closeable, an electronic unit disposed in at least one of the two cases, a flat-shaped cover member which is mounted to at least one of the cases and is overlapped with an outer surface of at least one of the cases to cover the outer surface, an electronic unit disposed in the cover member, and an electrically connecting/engaging unit which detachably engages at least one of the cases and the cover member with each other, and electrically connects the electronic unit in at least one of the cases and the electronic unit in the cover member with each other.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

The accompanying drawings, which are incorporated in and constitute a part of the invention, and together with the general description given above and the detailed description of the embodiments given below, serve to explain the principles of the invention.

DETAILED DESCRIPTION OF THE INVENTION

First Embodiment

Next, an electronic dictionary of a first embodiment of the present invention will be described with reference to FIGS. 1 to 6.

Figure 1:
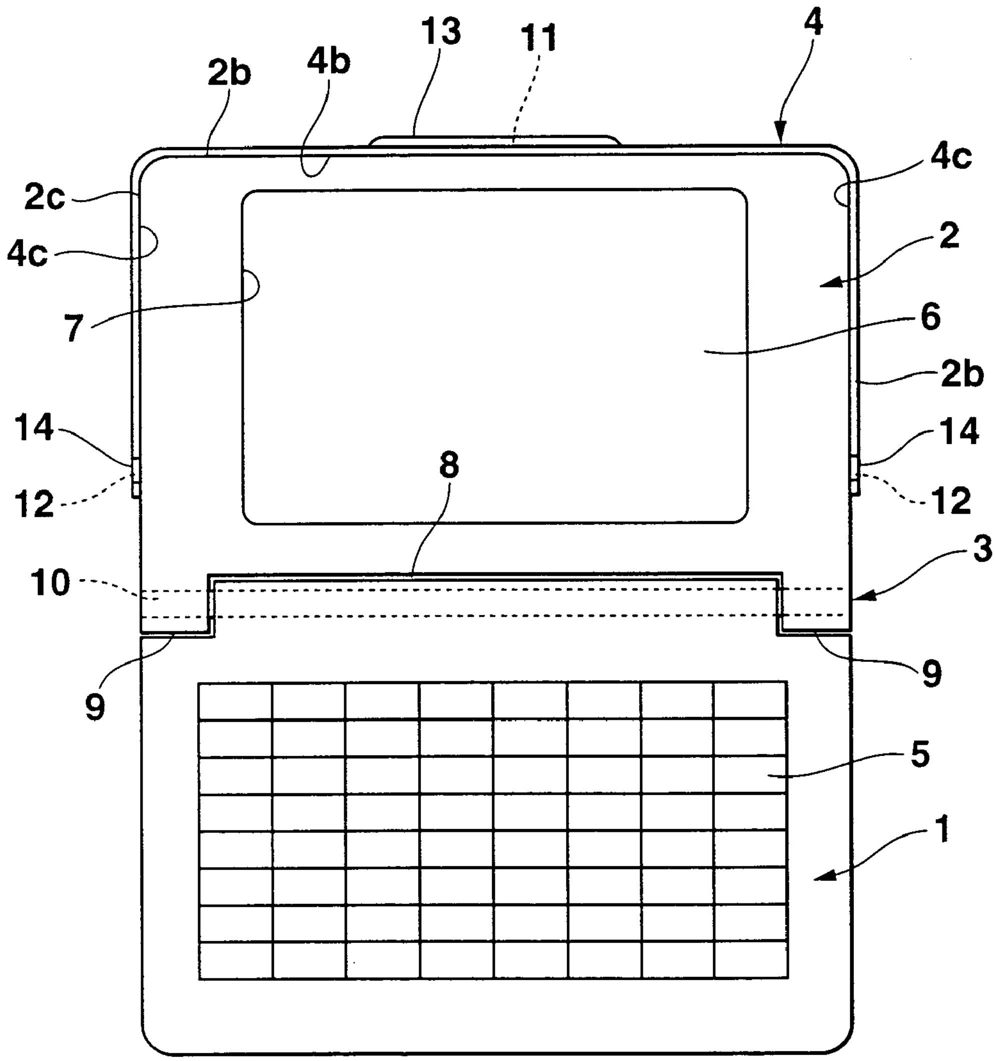
FIG. 1 is a front view showing an electronic dictionary of a first embodiment of the present invention in a folded-out state for use, in which a cover member is mounted on the electronic dictionary.
Figure 2:
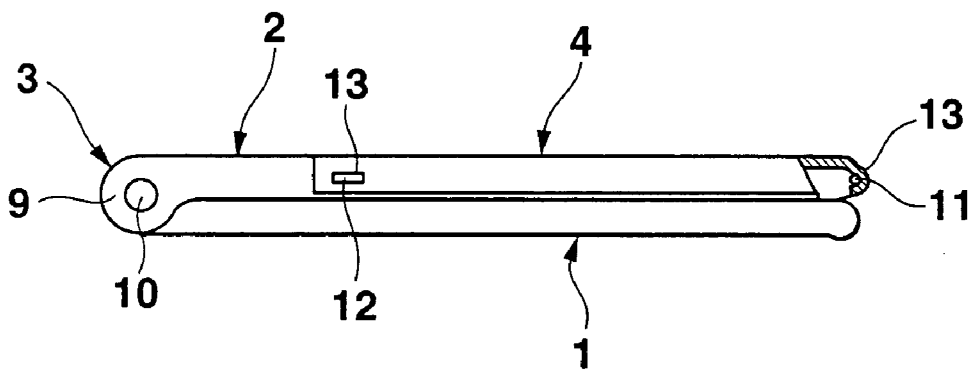
FIG. 2 is a partially broken side view of a carried state of the electronic dictionary of FIG. 1 on which the cover member is mounted.

As shown in FIGS. 1 and 2, the electronic dictionary comprises first and second cases 1 and 2, a hinge unit 3 which connects the first and second cases 1 and 2 with each other so that the first and second cases 1 and 2 are openable and closeable, and a decoration cover member 4 detachably attached on an outer surface of the second case 2.

As shown in FIG. 1, the first case 1 is formed in a nearly flat plate shape which is long in lateral directions, and a keyboard 5 is disposed therein. The keyboard 5 is exposed in an inner surface of the first case 1 which faces the second case 2 while the first and second cases 1 and 2 are in a closed state, and includes various keys such as character, cursor and functions keys.

Figure 3:
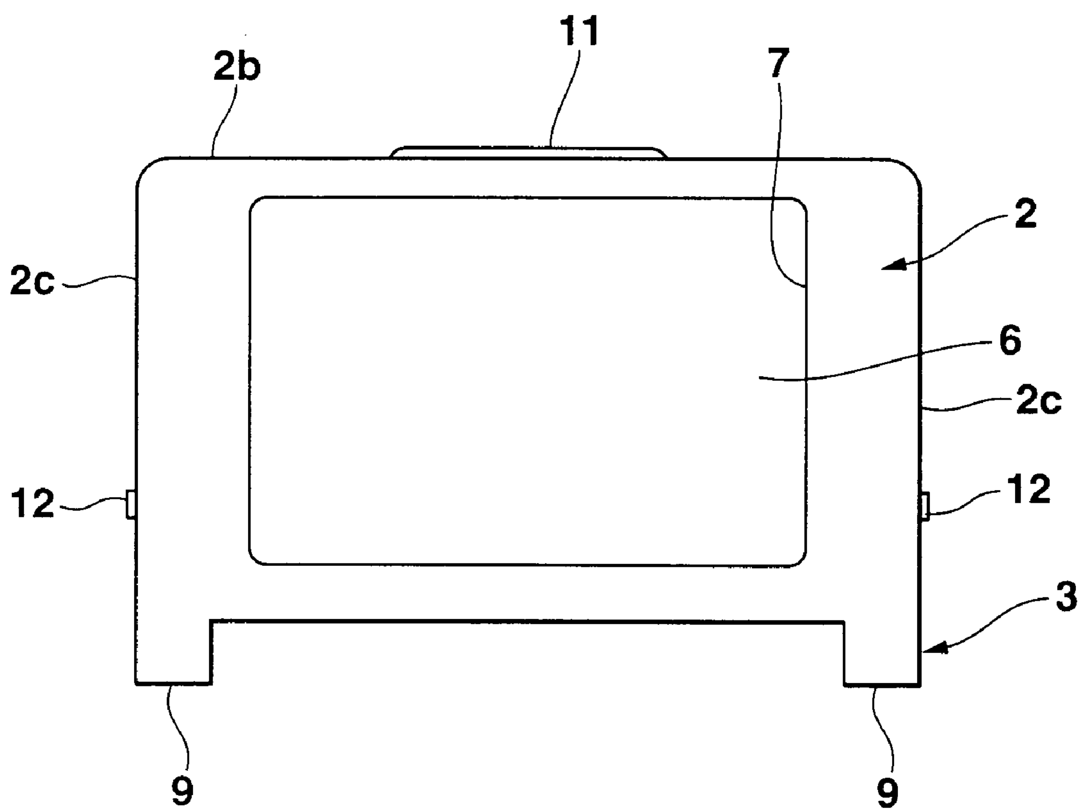
FIG. 3 is a front view showing only a second case of the electronic dictionary of FIG. 1.

As shown in FIGS. 1 to 3, the second case 2 has a flat plate shape of a size approximately equal to that of the first case 1, and a display unit 6 is disposed therein. The display unit 6 comprises a planar display device such as a liquid crystal display device or an electroluminescence (EL) device. As shown in FIGS. 1 and 3, a screen of the display unit 6 is exposed in an opening 7 formed in an inner surface of the second case 2 which faces the first case 1 while the first and second cases 1 and 2 are in the closed state.

As shown in FIG. 1, the hinge unit 3 comprises a first projecting portion 8 formed on an end surface of the first case 1 excluding both lateral side portions thereof, and a pair of second projecting portions 9 formed on both lateral side portions of an end surface of the second case 2. The first and second projecting portions 8, 9 are rotatably connected to each other by a connecting rod 10 in a state in which the first projecting portion 8 of the first case 1 is arranged between the pair of second projecting portions 9 of the second case 2. Electric and/or electronic units in the first and second cases 1, 2 are electrically connected to each other through the hinge unit 3 by a well-known connection member (not shown) such as a flexible wiring board.

Figure 4A:
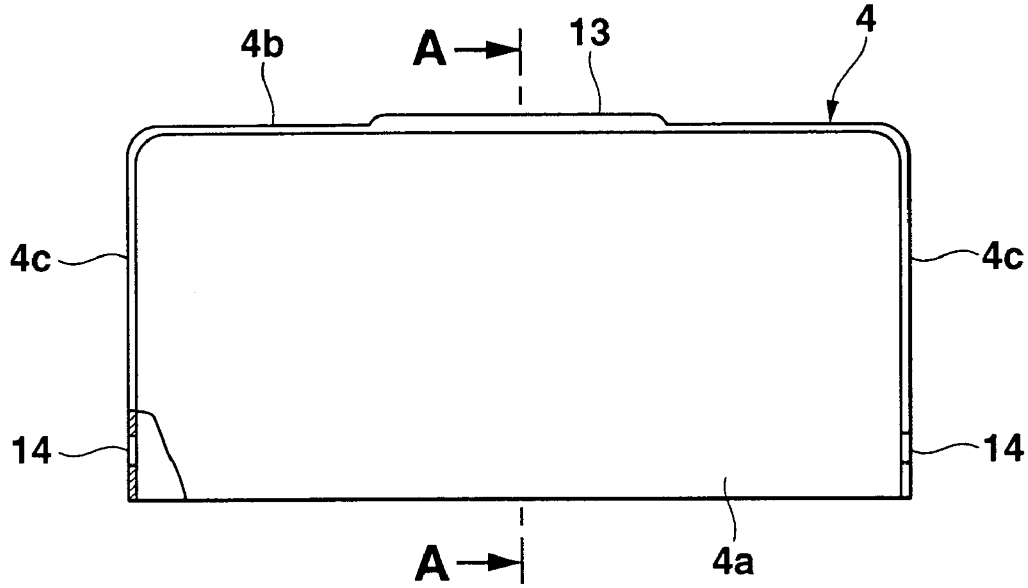
FIG. 4A is a partially broken view showing an inner surface of the cover member of FIG. 2.
Figure 4B:
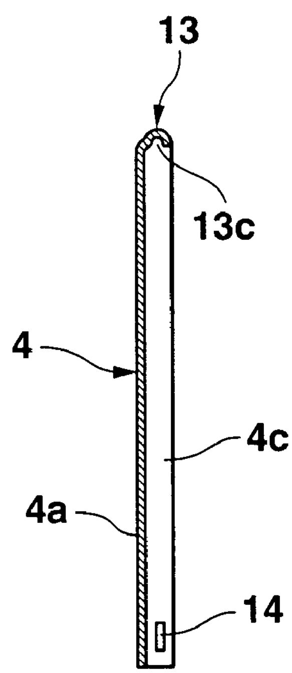
FIG. 4B is a sectional view cut along a line A—A of the cover member of FIG. 4A.

The cover member 4 is a thin metal plate made of such as a stainless steel or the like, and covers an outer surface 2*a* (upper surface in FIG. 6) of the second case 2. The cover member 4 also covers the other end, i.e., another end surface 2*b* (upper side in FIG. 3) of a tip end portion (being positioned away from the hinge unit 3) of the second case 2, and both lateral side surfaces 2*c* (right and left sides in FIGS. 1 and 3) of the second case 2. That is, as shown in FIGS. 4A and 4B, the cover member 4 includes a planar portion 4*a* which covers the outer surface 2*a* of the second case 2, a tip end skirt 4*b* which covers the end surface 2*b* (upper side in FIG. 3) of the tip end portion of the second case 2, and both lateral side skirts 4*c* which cover both left and right lateral side surfaces 2*c* of the second case 2. At least one of various designs (not shown) such as a color, a pattern, a graphic and a mark is formed on an outer surface of the planar portion 4*a*, and a plurality of cover members 4 different from one another in design are prepared.

Figure 5:
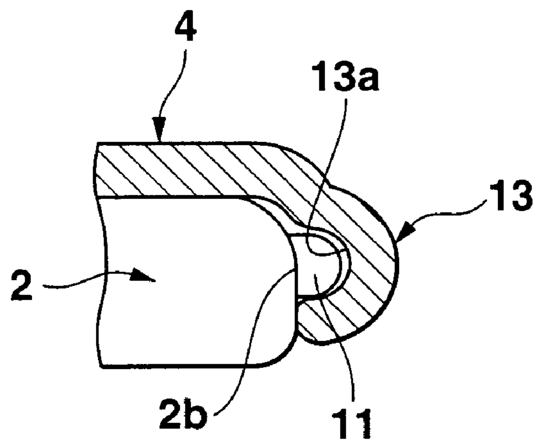
FIG. 5 is an enlarged sectional view of a main portion of the cover member of FIG. 2.

As shown in FIG. 3, engaging projections 11, 12 are disposed on the end surface 2*b* (upper side in FIG. 3) of the tip end portion of the second case 2 and both left and right lateral side surfaces 2*c* thereof. As shown in FIG. 5, the engaging projection 11 on the tip end surface 2*b* of the second case 2 has a semicircular cross section, and it is thin and long in right and left lateral directions at a middle portion on the tip end surface 2*b* of the second case 2 in a thickness direction thereof and in the right and left lateral directions in FIG. 3. Such an engaging projection 11 on the tip end surface 2*b* of the second case 2 provides decoration to the tip end surface 2*b* of the second case 2.

As shown in FIG. 3, each of the engaging projections 12 on both right and left lateral side surfaces 2*c* of the second case 2 has a semicircular cross section as in the case of the engaging projection 11 on the tip end surface 2*b*, and is positioned at a middle portion on each of both right and left lateral side surfaces 2*c* in the thickness direction of the second case 2 and in the vicinity of the hinge unit 3 (bottom end in FIG. 3). Each of the engaging projections 12 is long in back-and-forth directions (up-and-down directions in FIG. 3). The engaging projections 12 on both right and left lateral side surfaces 2*c* of the second case 2 also provide decoration to both lateral side surfaces 2*c* of the second case 2.

As shown in FIGS. 4A and 4B, engaging portions 13, 14 which are detachably engaged with the engaging projections 11, 12 on the end surface 2*b* and both side lateral surfaces 2*c* of the second case 2 are formed on the tip end skirt 4*b* and the lateral side skirts 4*c* of the cover member 4. As shown in FIG. 5, the engaging portion 13 of the tip end skirt 4*b* of the cover member 4 which is engaged with the engaging projection 11 of the end surface 2*b* of the second case 2 has a concavity 13*a* formed on an inner surface of a projection disposed on the tip end skirt 4*b* of the cover member 4 and having a semicircular cross section as in the case of the engaging projection 11 of the second case 2. The concavity 13*a* has the same shape and dimensions as those of the engaging projection 11 which is engaged therewith. As shown in FIGS. 4A and 4B, each of the engaging portions 14 on both lateral side skirts 4*c* of the cover member 4 which are engaged with the engaging projections 12 on both lateral side surfaces 2*b* of the second case 2 is formed to be a thin and long hole having the same shape and dimensions as those of each of the engaging projections 12 on both side lateral surfaces 2*c* of the second case 2.

Figure 6:
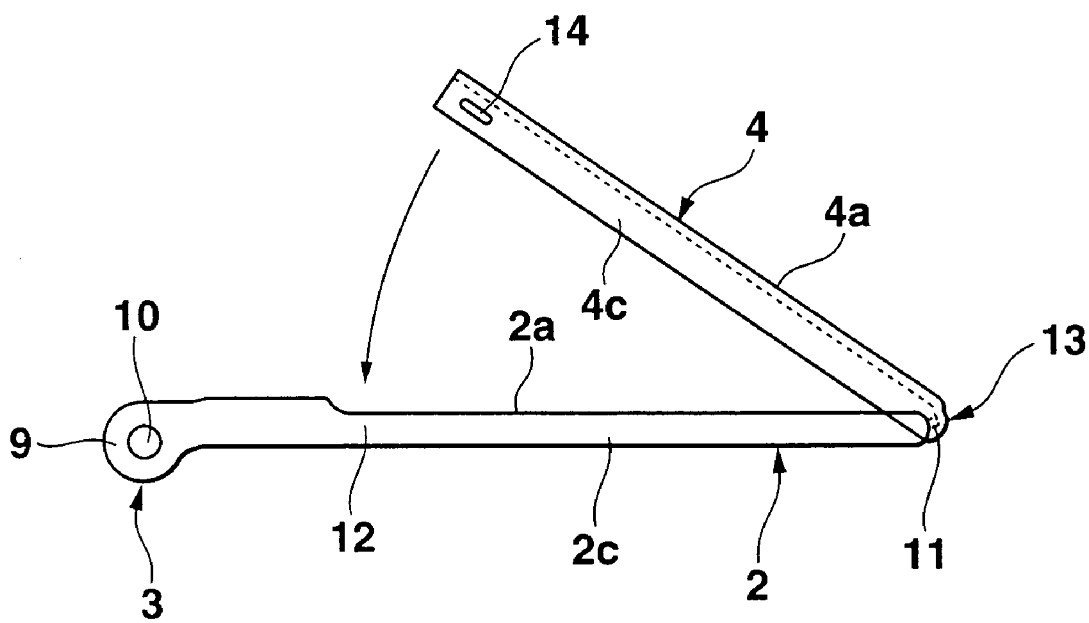
FIG. 6 is a side view showing a situation of mounting the cover member of FIG. 4A on the second case of the electronic dictionary of FIG. 1.

Next, an operation for mounting the cover member 4 on the second case 2 will be described. As shown in FIG. 6, the concavity 13*a* of the tip end skirt 4*b* of the cover member 4 is hooked on the engaging projection 11 of the end surface 2*b* of the second case 2. Then, in this state, the cover member 4 is rotated around the engaging projection 11 of the end surface 2*b* of the second case 2 toward the outer surface 2*a* of the second case 2. The planar portion 4*a* of the cover member 4 is arranged to be overlapped on the outer surface 2*a* of the second case 2, and the right and left lateral side skirts 4*c* of the cover member 4 are arranged to be overlapped on the right and left lateral side surfaces 2*c* of the second case 2. Then, the engaging projections 12 on both lateral side surfaces 2*c* of the second case 2 are inserted into and engaged with the engaging portions 14 of both lateral side skirts 4*c* of the cover member 4.

As a result, as shown in FIGS. 1 and 2, the cover member 4 is mounted on the second case in the state of covering the outer surface (upper surface in FIG. 6) of the second case 2, the end surface 2*b* of the tip end portion of the second case 2, and both right and left lateral side surfaces 2*c* of the second case 2. To remove the cover member 4 from the second case 2, first, the engaging projections 12 of both lateral side surfaces 2*b* of the second case 2 are separated from the engaging portions 14 of both lateral side skirts 4*c* of the cover member 4. Then, the cover member 4 is rotated around the engaging projection 11 of the tip end surface 2*b* of the second case 2 in a direction in which the cover member 4 is separated from the outer surface 2*a* of the second case 2. Lastly, the concavity 13*a* of the engaging portion 13 of the tip end skirt 4*b* of the cover member 4 is separated from the engaging projection 11 of the tip end surface 2*b* of the second case 2.

According to such an electronic dictionary, when the first case 1 and the second case 2 are rotated around the hinge unit 3 to be folded out, as shown in FIG. 1, a plurality of keys of the keyboard 5 in the inner surface of the first case 1 are exposed to external space, and a screen of the display unit 6 in the opening 7 of the inner surface of the second case 2 is exposed to the external space. Thus, while a user of the electronic dictionary of this embodiment watches the screen of the display unit 6, the user operates the plurality of keys of the keyboard 5 to put information into the internal electric and/or electronic unit of at least one of the first case 1 and the second case 2, and the entered information and desired information processed by the electric and/or electronic unit based on the entered information can be displayed on the screen of the display unit 6. When the first case 1 and the second case 2 are rotated around the hinge unit 3 to be closed, as shown in FIG. 2, the first case 1 and the second case 2 overlap each other to make the electronic dictionary compact. Thus, mobility of the electronic dictionary can be improved. In this case, it is possible to obtain advantages of the decoration of the outer surface of the cover member 4 mounted on the second case 2.

Thus, according to the electronic dictionary, by detachably engaging the engaging portions 13, 14 of the cover member 4 with the engaging projections 11, 12 disposed in at least the second case 2 of the first and second cases 1, 2, the cover member 4 for decoration can be detachably mounted on the outer surface of the second case 2. Accordingly, free replacement can be made among the plural kinds of cover members 4 for decoration which are prepared beforehand, and the design such as a color, graphic, and/or pattern of the surface of the electronic dictionary can be freely changed in accordance with user's taste. When the cover member 4 is removed from the second case 2, the engaging projections 11, 12 disposed on the tip end surface 2*c* and both side surfaces 2*b* of the second case 2 are exposed to the external space. However, the engaging projections 11, 12 of the second case 2 also provide decorativeness to the outer surface of the second case 2. Thus, a good appearance can be provided to the electronic dictionary in a state in which the cover member 4 is removed from the second case 2.

Furthermore, according to the electronic dictionary, the engaging projections 11, 12 of the second case 2 are disposed on the tip end surface 2*b* positioned away from the hinge unit 3 and on both lateral side surfaces 2*c* in the vicinity of the hinge unit 3 on the second case 2, and the engaging portions 13, 14 of the cover member 4 are disposed on the tip end skirt 4*b* and both lateral side skirts 4*c* of the cover member 4 corresponding to the tip end surface 2*b* and both lateral side surfaces 2*c* of the second case 2. Thus, when the cover member 4 is mounted on the second case 2, the cover member 4 can be mounted on the outer surface of the second case 2 in a sure and stable state.

Second Embodiment

Next, an electronic dictionary of a second embodiment of the present invention will be described with reference to FIGS. 7 to 11. Portions of the second embodiment similar to those of the first embodiment described above with reference to FIGS. 1 to 6 are denoted by the same reference numerals as those denoting the same portions of the first embodiment, and detailed description thereof will be omitted.

Figure 7:
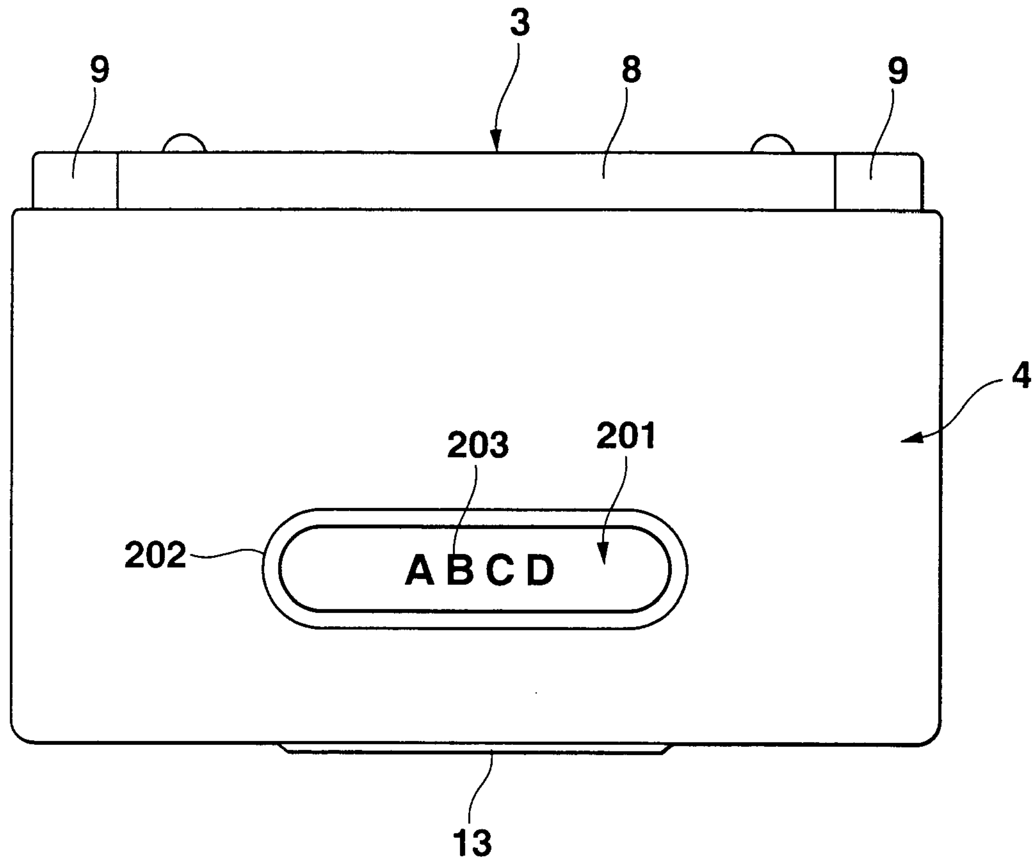
FIG. 7 is a front view showing an electronic dictionary of a second embodiment of the present invention in a closed state during carrying, in which a cover member is mounted on the electronic dictionary.
Figure 8:
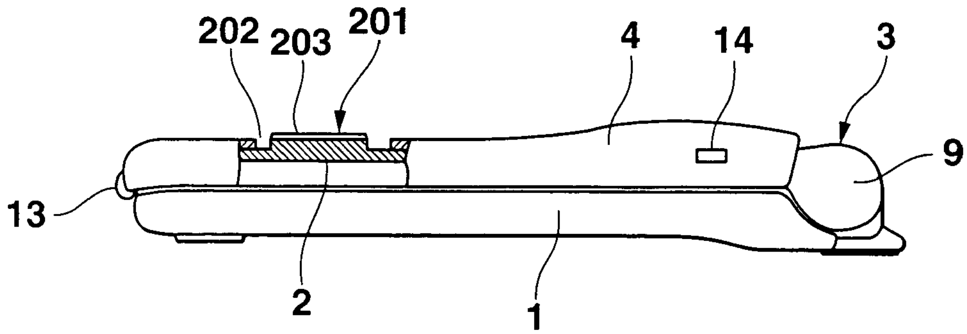
FIG. 8 is a partially broken side view of the electronic dictionary of FIG. 7 on which the cover member is mounted.

In the electronic dictionary, as shown in FIGS. 7 to 10, a decoration 201 is disposed on an outer surface of a second case 2 on which a cover member 4 is mounted. As shown in FIGS. 7 and 8, an opening 202 is formed in the cover member 4 corresponding to the decoration 201 on the outer surface of the second case 2. Other components of the electronic dictionary of the second embodiment are the same as those of the first embodiment.

Figure 9:
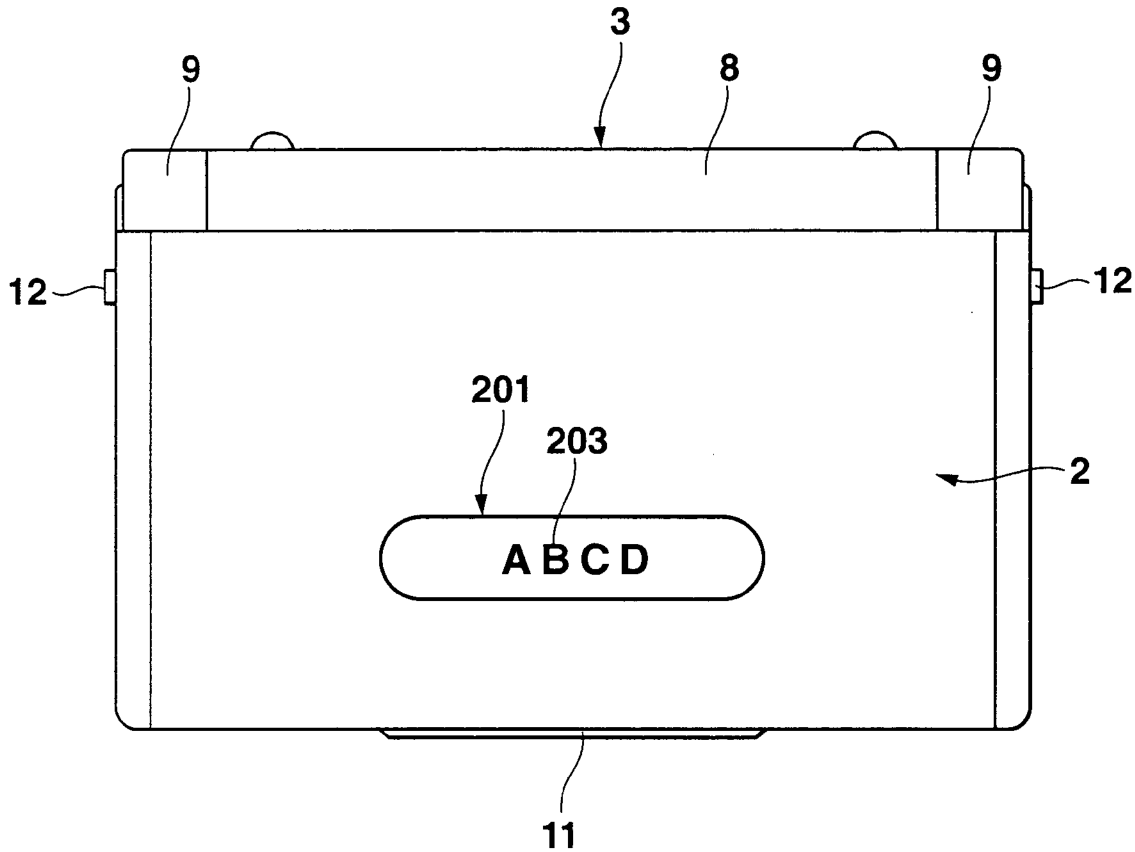
FIG. 9 is a front view showing a second case of the electronic dictionary of FIG. 7 in a cover member removed state.
Figure 10:
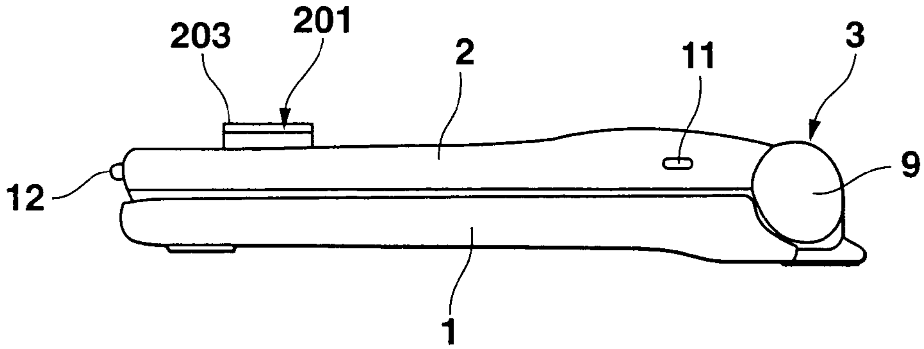
FIG. 10 is a side view of the electronic dictionary of FIG. 9.
Figure 11:
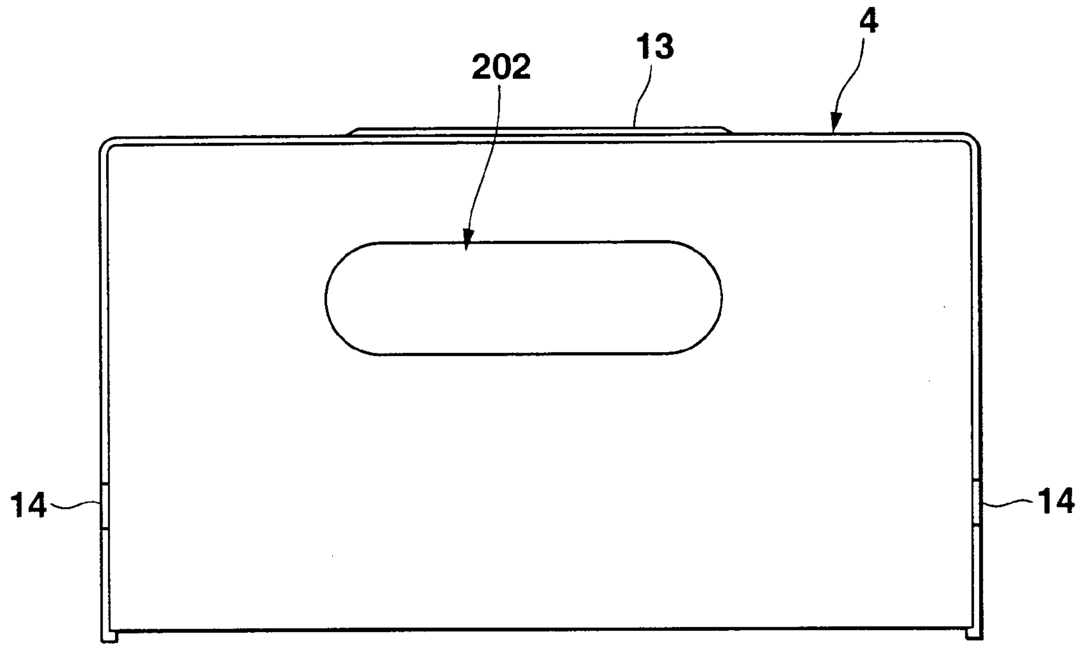
FIG. 11 is a view showing an inner surface of the cover member of FIG. 7.

As shown in FIGS. 9 and 10, the decoration 201 of the second case 2 is a projecting portion of a thin and long shape in which both ends in its longitudinal direction are formed semicircular, and disposed in a position slightly closer to a tip end surface (bottom side in FIG. 9) of the second case than the center on the outer surface of the second case 2. A satin-finish is performed on an outer surface of the decoration 201, and a mark 203 such as a symbol, a graphic, and/or a pattern is disposed thereon. As shown in FIGS. 7 and 11, the opening 202 of the cover member 4 also has a thin and long shape in which both ends in its longitudinal direction are formed semicircular. It is similar in shape to the decoration 201 on the outer surface of the second case 2, but slightly larger in dimensions. Thus, when the cover member 4 is mounted on the second case 2, as shown in FIG. 8, the decoration 201 on the outer surface of the second case 2 is arranged in the opening 202 of the cover member 4, and exposed through the opening 202 to external space.

According to such an electronic dictionary, it is possible to obtain technical advantages similar to those of the first embodiment. Irrespective of mounting of the cover member 4 on the outer surface of the second case 2, the decoration 201 of the second case 2 can be seen from the external space.

Modification of Second Embodiment

Next, a modification of the second embodiment of the present invention will be described with reference to FIGS. 12 to 14. Portions of the modification similar to those of the first embodiment described above with reference to FIGS. 1 to 6 and those of the second embodiment described above with reference to FIGS. 7 to 11 are denoted by the same reference numerals as those denoting the same portions of the first and second embodiments, and detailed description thereof will be omitted.

Figure 12:
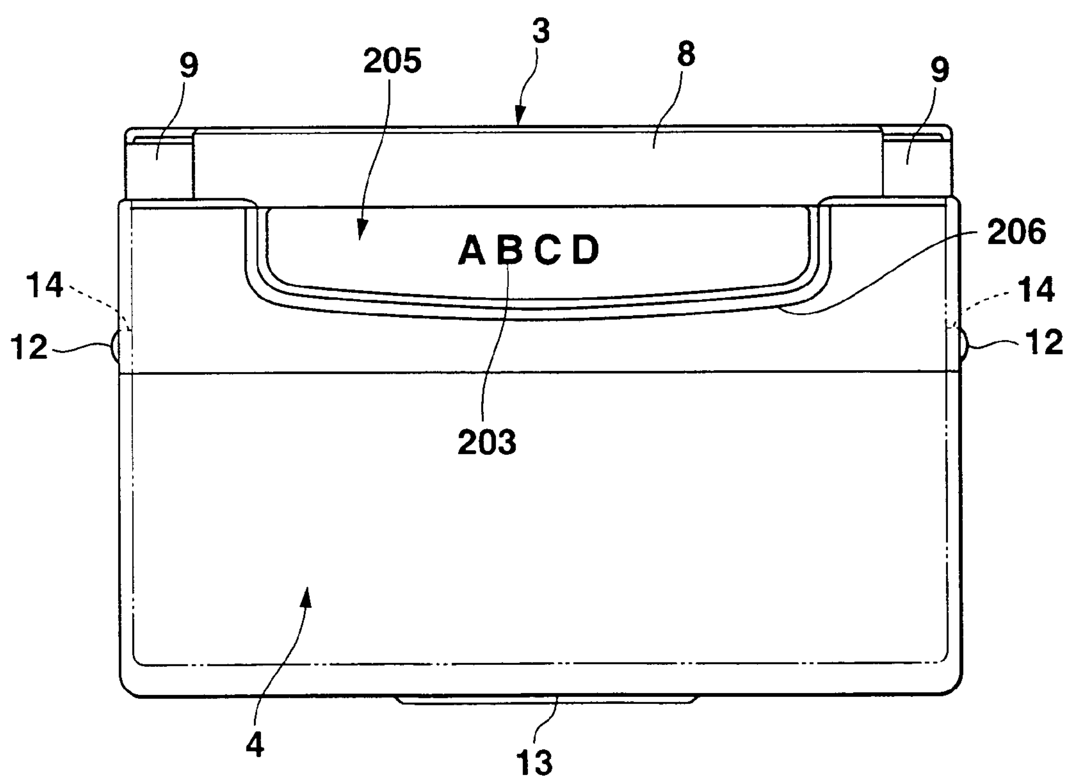
FIG. 12 is a front view showing an electronic dictionary of a modification of the second embodiment in a closed state during carrying, in which a cover member is mounted on the electronic dictionary.
Figure 13:
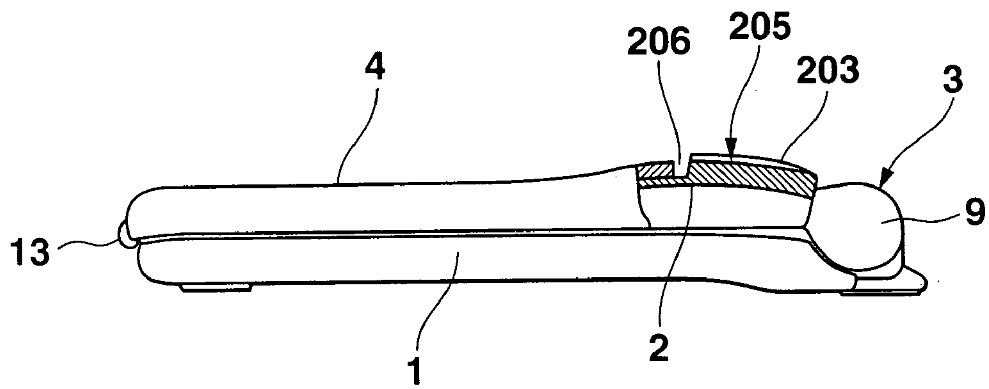
FIG. 13 is a partially broken side view of the electronic dictionary of FIG. 12 on which the cover member is mounted.
Figure 14:
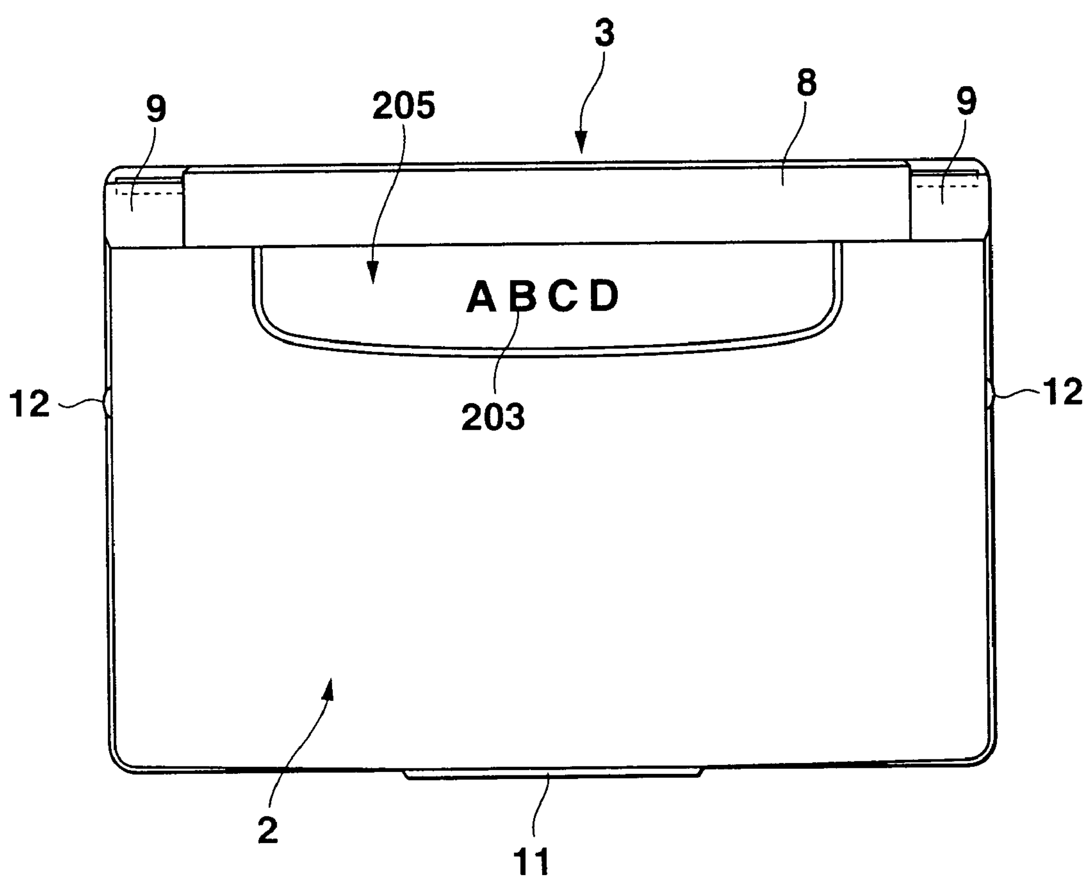
FIG. 14 is a front view showing a second case of the electronic dictionary of FIG. 12 in a cover member removed state.

In the modification of the second Embodiment shown in FIGS. 12 to 14, a decoration 205 is disposed along an end (upper side in FIG. 12) adjacent to a hinge unit 3, i.e., a base end, on an outer surface of a second case 2. In this case, in a cover member 4, an opening 206 is disposed along the end (upper side in FIG. 12) adjacent to the hinge unit 3 corresponding to the decoration 205. As in the case of the aforementioned decoration 201, the decoration 205 is formed in a projecting shape to project from the outer surface of the second case 2, and the opening 206 can be formed as a notch in the end (upper side in FIG. 12) of the cover member 4. The opening 206 is similar in shape to the decoration 205, but slightly larger in dimension. Thus, when the cover member 4 is mounted, as shown in FIG. 13, the decoration 205 on the outer surface of the second case 2 is arranged in the opening 206 of the cover member 4, and exposed through the opening 206 to external space. That is, according to the modification, technical advantages similar to those of the second embodiment can be provided.

Third Embodiment

Next, an electronic dictionary of a third embodiment of the present invention will be described with reference to FIGS. 15 and 16. Portions of the third embodiment similar to those of the first embodiment described above with reference to FIGS. 1 to 6 and those of the second embodiment described above with reference to FIGS. 7 to 11 are denoted by the same reference numerals as those denoting the same portions of the first and second embodiments, and detailed description thereof will be omitted.

Figure 15:
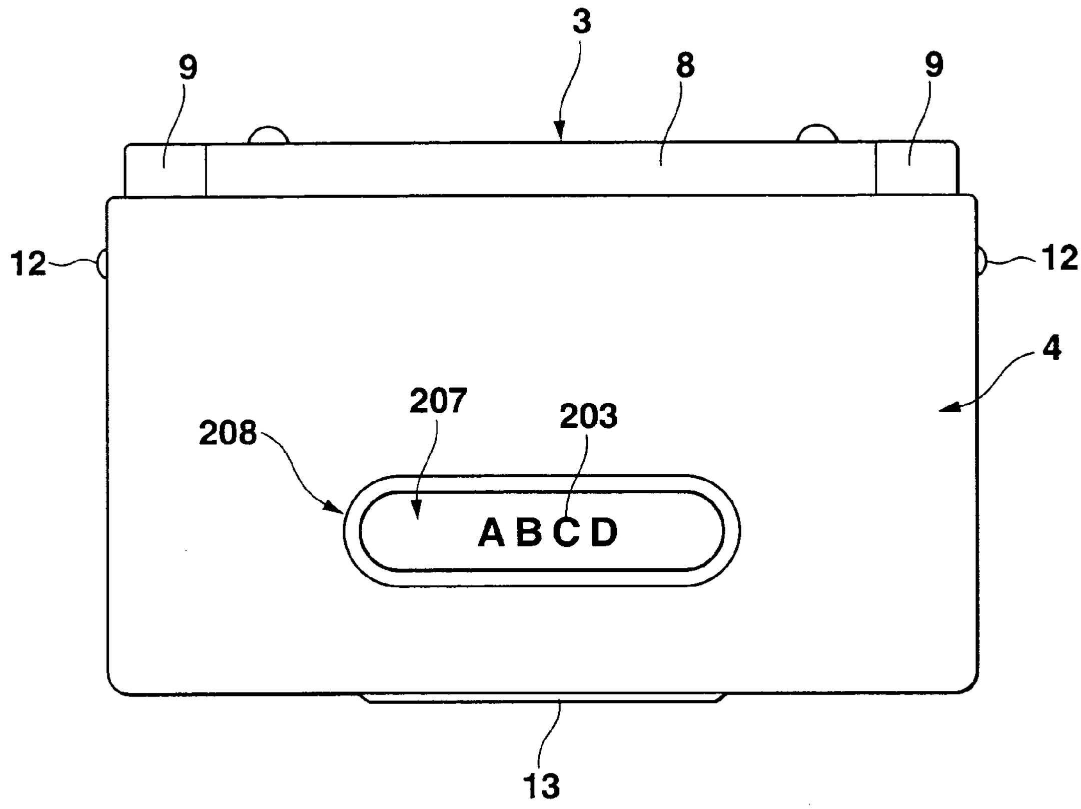
FIG. 15 is a front view showing an electronic dictionary of a third embodiment of the present invention in a closed state during carrying, in which a cover member is mounted on the electronic dictionary.
Figure 16:
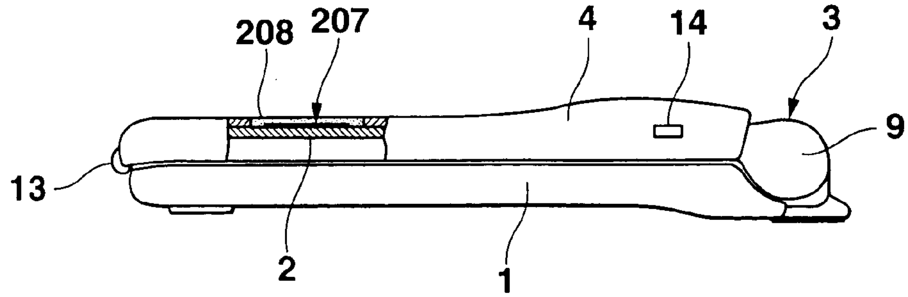
FIG. 16 is a partially broken side view of the electronic dictionary of FIG. 15 on which the cover member is mounted.

In the electronic dictionary, as shown in FIGS. 15 and 16, a decoration 207 is disposed on an outer surface of a second case 2 on which a cover member 4 is mounted. A transparent light transmit member 208 is disposed in the cover member 4 corresponding to the decoration 207 of the second case 2. Other components of the electronic dictionary of the third embodiment are the same as those of the second embodiment.

As shown in FIGS. 15 and 16, the decoration 207 of the second case 2 is a thin and long flat portion in which both ends in its longitudinal direction are formed semicircular, and is disposed in a position slightly closer to a tip end surface of the second case than the center (bottom side in FIG. 15) on the outer surface of the second case 2 as in the case of the decoration 201 of the second embodiment. A satin-finish is performed on an outer surface of the decoration 207, and a mark 203 such as a symbol, a graphic, and/or a pattern is disposed thereon. The transparent light transmit member 208 of the cover member 4 also has a thin and long shape in which both ends in its longitudinal direction are formed semicircular. It is similar in shape to the decoration 207 on the outer surface of the second case 2, but slightly larger in dimensions. Thus, when the cover member 4 is mounted on the second case 2, as shown in FIG. 15, the decoration 207 on the outer surface of the second case 2 is arranged to face the transparent light transmit member 208 of the cover member 4, and the decoration can be viewed through the light transmit member 208 from external space.

According to such an electronic dictionary, it is possible to obtain technical advantages similar to those of the first embodiment. Irrespective of mounting of the cover member 4 on the outer surface of the second case 2, the decoration 207 of the second case 2 can be seen from the external space.

Modification of Third Embodiment

Next, a modification of the third embodiment will be described with reference to FIGS. 12 to 14 showing the modification of the second embodiment and FIG. 15 showing the third embodiment.

In the modification of the third embodiment, as in the case of the modification of the second embodiment described above with reference to FIGS. 12 to 14, the decoration 207 is disposed along an end (upper side in FIG. 15) adjacent to the hinge unit 3 on the outer surface of the second case 2. In the cover member 4, the transparent light transmit member 208 can be disposed along the end (upper side in FIG. 15) adjacent to the hinge unit 3 corresponding to the decoration 207. According to the modification, technical advantages similar to those of the third embodiment can be provided.

According to the first to third embodiments, and the modifications of the second and third embodiments, the engaging projections 11, 12 are disposed on the tip end surface 2*b* of the second case 2 and on both lateral side surfaces 2*c* at the positions adjacent to the hinge unit 3, and the engaging portions 13, 14 which are detachably engaged with the engaging projections 11, 12 of the second case 2 are disposed on the tip end skirt 4*b* of the cover member 4 and on both lateral side skirts 4*c* at the positions adjacent to the hinge unit 3. Instead, however, for example, a structure can be employed in which an engaging projection 11 is disposed on the tip end surface 2*b* of the second case 2, an engaging concavity (not shown) is disposed on a portion adjacent to the hinge unit 3 except the decoration 201, 205 or 207 on the outer surface of the second case 2, an engaging portion 13 is disposed on the tip end skirt 4*b* of the cover member 4 to be detachably engaged with the engaging projection 11 of the second case 2, and an engaging projecting portion (not shown) is disposed on the inner surface of the cover member 4 corresponding to the outer surface of the cover member 4 to be detachably fitted in the engaging concavity on the outer surface of the second case 2.

Fourth Embodiment

Figure 17:
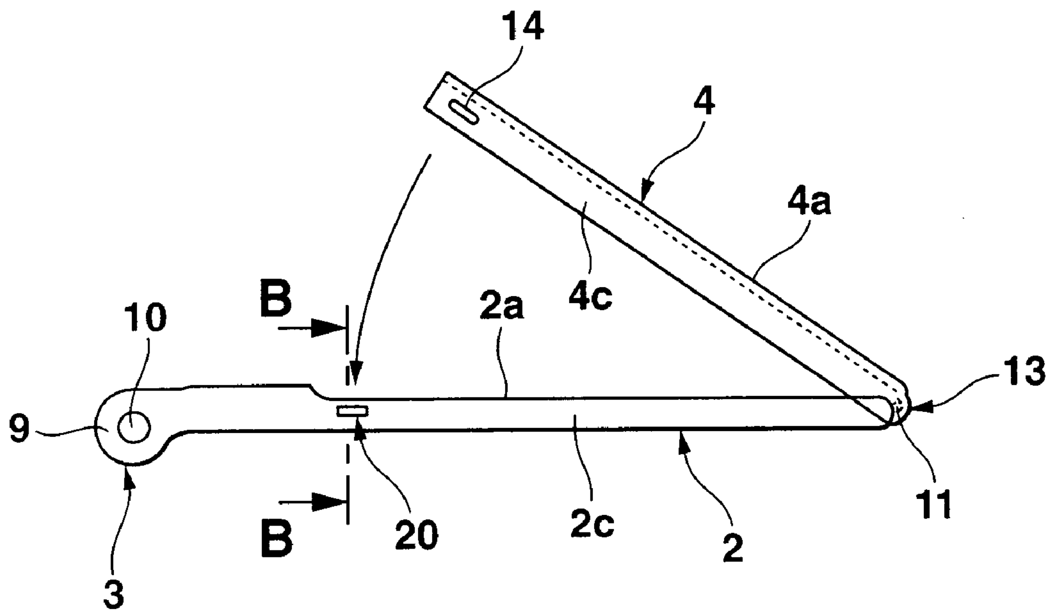
FIG. 17 is a side view showing a situation of mounting a cover member on a second case of an electronic dictionary of a fourth embodiment of the present invention.

Next, an electronic dictionary of a fourth embodiment of the present invention will be described with reference to FIGS. 17 and 18. Portions of the fourth embodiment similar to those of the first embodiment described above with reference to FIGS. 1 to 6 are denoted by the same reference numerals as those denoting the same portions of the first embodiment, and detailed description thereof will be omitted.

In the electronic dictionary, engaging portions 20 are disposed in both right and left lateral side surfaces 2*c* of a second case 2 at positions adjacent to a hinge unit 3. The engaging portions 20 are detachably engaged with engaging portions 14 disposed on both right and left side skirts 4*c* of a cover member 4. Other components of the electronic dictionary of the fourth embodiment are the same as those of the first embodiment.

Figure 18:
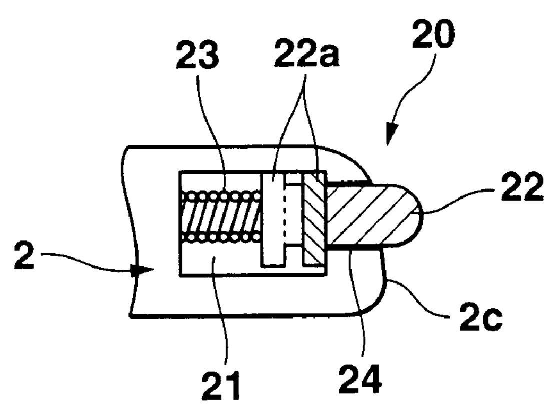
FIG. 18 is an enlarged sectional view of an engaging unit cut along a line B—B of FIG. 17.

As shown in FIG. 18, the engaging portion 20 includes an engaging projection 22 and an urging member 23 such as a coil spring, and the engaging projection 22 and the urging member 23 are housed in a concavity 21 disposed in each of both right and left lateral side surfaces 2*c* (only one lateral side surface is shown in FIG. 18) of the second case 2. A hole 24 through which a tip end portion of the engaging projection 22 can projects out from and retracts in the concavity 21 is formed continuously from the concavity 21 to the lateral side surface 2*c* of the second case 2. A flange 22*a* is disposed on an outer periphery of the engaging projection 22, the flange 22*a* abuts a region of an inner surface of the concavity 21 around an inner end of the hole 24 to prevent the engaging projection 22 from falling out through the hole 24 from the concavity 21. The tip end portion of the engaging projection 22 is projected out from the concavity 21 to the outside through the hole 24 by an urging force of the urging member 23.

According to such an electronic dictionary, it is possible to obtain technical advantages similar to those of the first embodiment. Further, the following technical advantages can be obtained. That is, since the engaging projection 22 of the engaging portion 20 can be projected from and retracted in the second case under the urging force of the urging member 23, the engaging projection 22 can be surely engaged with the engaging portion 14 of the cover member 4 by the urging force of the urging member 23. By pressing the engaging projection 22 into the concavity 21 of the second case 2 through the hole 24 against the urging force of the urging member 23, detachable attachment of the engaging portion 14 of the cover member 4 to the engaging projection 22 can be facilitated. Thus, the work for mounting the cover member 4 on the second case 2 is improved in the fourth embodiment.

Fifth Embodiment

Next, an electronic dictionary of a fifth embodiment of the present invention will be described with reference to FIGS. 19 and 20. Portions of the fifth embodiment similar to those of the first embodiment described above with reference to FIGS. 1 to 6 are denoted by the same reference numerals as those denoting the same portions of the first embodiment, and detailed description thereof will be omitted.

In the electronic dictionary, engaging portions 30 are disposed on a pair of second projecting portions 9 of a hinge unit 3 positioned on both right and left lateral side surfaces 2*c* of a second case 2, and engaging portions 31 are formed on both right and left side skirts 4*c* of a cover member 4 to be detachably engaged with the pair of second projecting portions 9 of the hinge unit 3. Other components of the electronic dictionary of the fifth embodiment are similar to those of the first embodiment.

Figure 19:
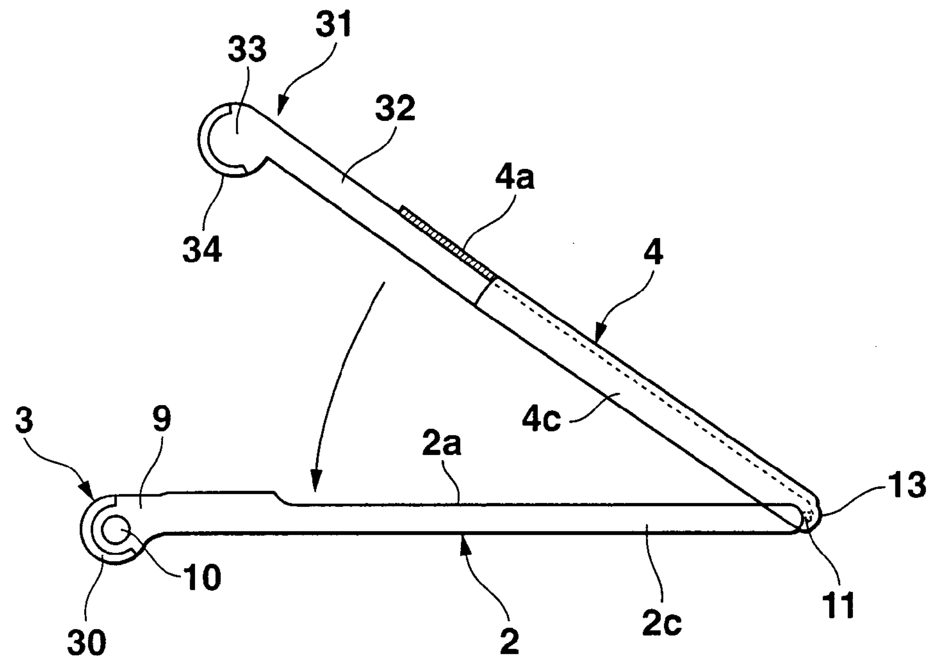
FIG. 19 is a side view showing a situation of mounting a cover member on a second case of an electronic dictionary of a fifth embodiment of the present invention.
Figure 20:
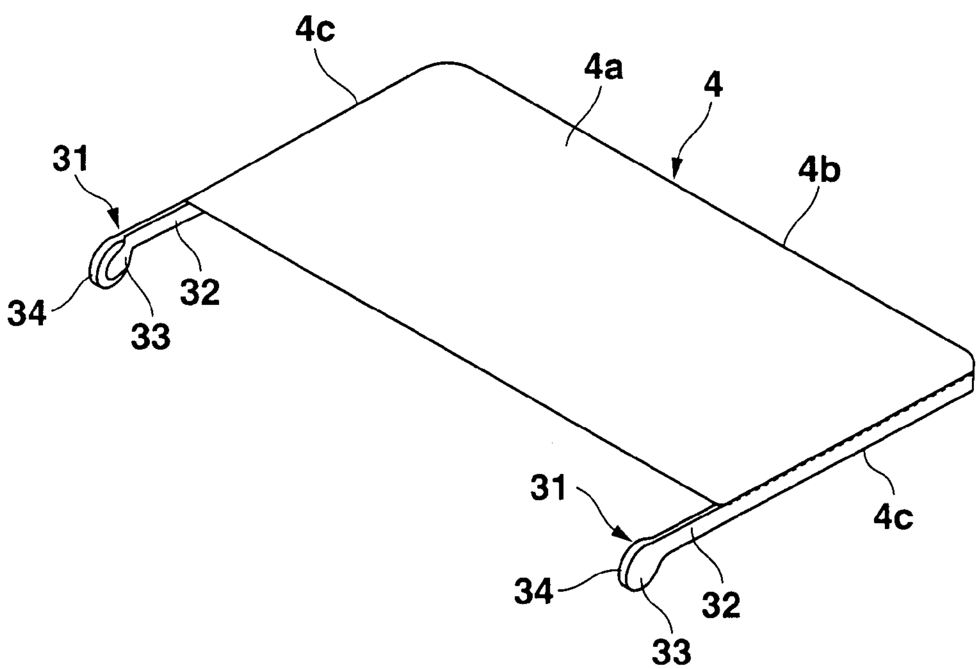
FIG. 20 is a perspective view of the cover member of FIG. 19.

More specifically, as shown in FIG. 19, the engaging portion 30 on each of both right and left lateral side surfaces 2*c* of the second case 2 has a semicircular-arc groove formed on an outer surface of each of the pair of second projecting portions 9 of the hinge unit 3. As shown in FIGS. 19 and 20, the engaging portion 31 on each of both right and left lateral side skirts 4*c* of the cover member 4 includes a circular plate 33 on a tip end of an arm 32 extended from each of both right and left lateral side skirts 4*c* of the cover member 4. A semicircular-arc engaging projecting portion 34 is formed on an inner surface of the circular plate 33. The pair of arms 32 can be flexible in directions in which the pair of arms 32 approach each other and move away from each other.

According to such an electronic dictionary, it is possible to obtain technical advantages similar to those of the first embodiment. Further, the following technical advantages can be obtained. By flexing the pair of arms 32 extended from both right and left lateral side skirts 4*c* of the cover member 4 in the mutually moving away direction, when the cover member 4 is mounted on the second case 2, the semicircular-arc engaging projecting portion 34 of the circular plate 33 on the tip of each of the pair of arms 32 can be detachably engaged easily with the semicircular-arc engaging portion 30 disposed on the outer surface of each of the pair of second projecting portions 9 of the hinge unit 3 on both right and left lateral side surfaces 2*c* of the second case 2. Thus, as in the case of the fourth embodiment, the work for mounting the cover member 4 on the second case 2 is improved in the fifth embodiment.

Modification of Fifth Embodiment

Next, an electronic dictionary of a modification of the fifth embodiment of the present invention will be described with reference to FIGS. 21 and 22. Portions of the modification similar to those of the first embodiment described above with reference to FIGS. 1 to 6 and the fifth embodiment described above with reference to FIGS. 19 and 20 are denoted by the same reference numerals as those denoting the same portions of the first and fifth embodiments, and detailed description thereof will be omitted.

According to the fifth embodiment, the semicircular-arc engaging projecting portions 34 are disposed on the inner surfaces of the circular plates 33 on the tip ends of the pair of arms 32 extended from both side skirts 4*c* of the cover member 4, and the semicircular-arc grooves of engaging portions 30 are disposed on the outer surfaces of the pair of second projecting portions 9 of the hinge unit 3 on both lateral side surfaces 2*c* of the second case 2.

Figure 21:
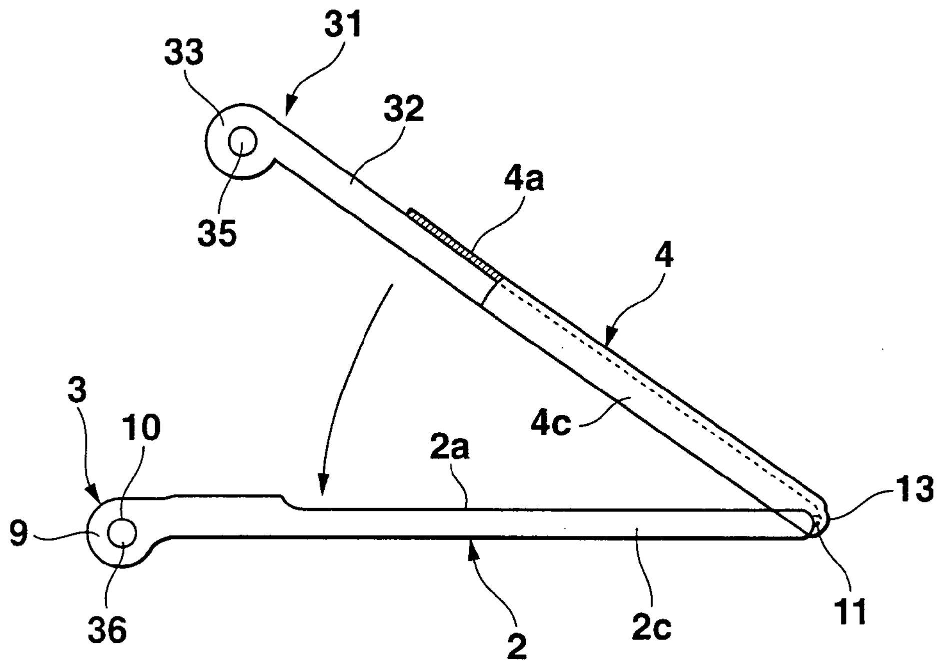
FIG. 21 is a side view showing a situation of mounting a cover member on a second case of an electronic dictionary of a modification of the fifth embodiment.
Figure 22:
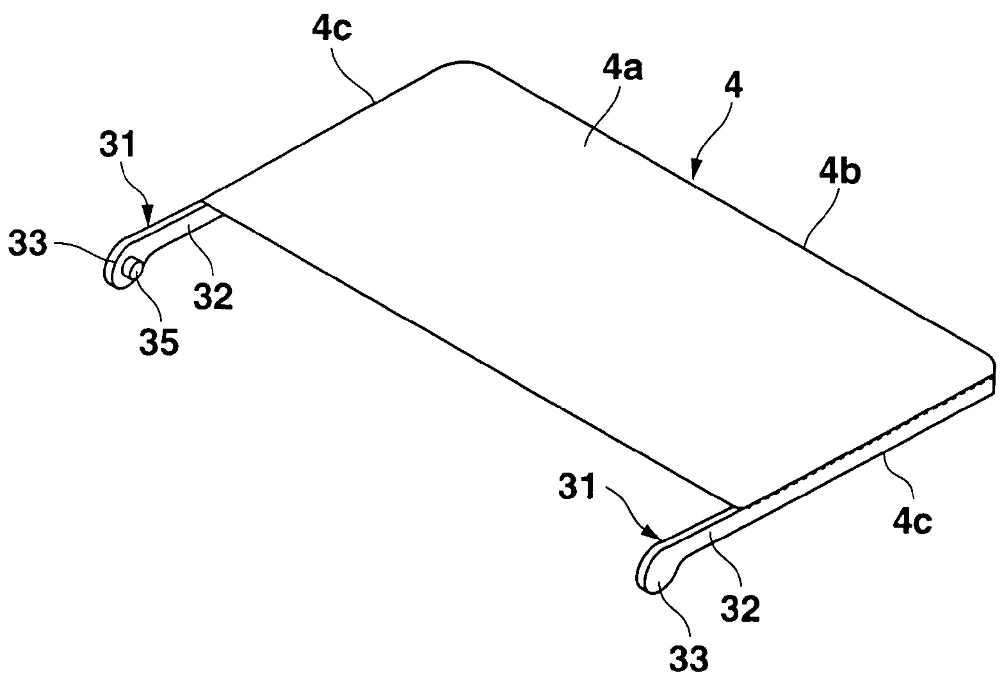
FIG. 22 is a perspective view of the cover member of FIG. 21.

However, instead of this structure, for example, a structure as shown in FIGS. 21 and 22 can be employed in which columnar engaging projecting portions 35 are disposed on centers of the inner surfaces of the circular plates 33 on the tip ends of the pair of arms 32 of the cover member 4, and circular holes 36 of engaging portions which can detachably engage the engaging projecting portions 35 are disposed on centers of outer lateral side surfaces of the pair of second projecting portions 9 of the hinge unit 3 of the second case. According to such a modification, technical advantages similar to those of the fifth embodiment can be provided.

Sixth Embodiment

Figure 23:
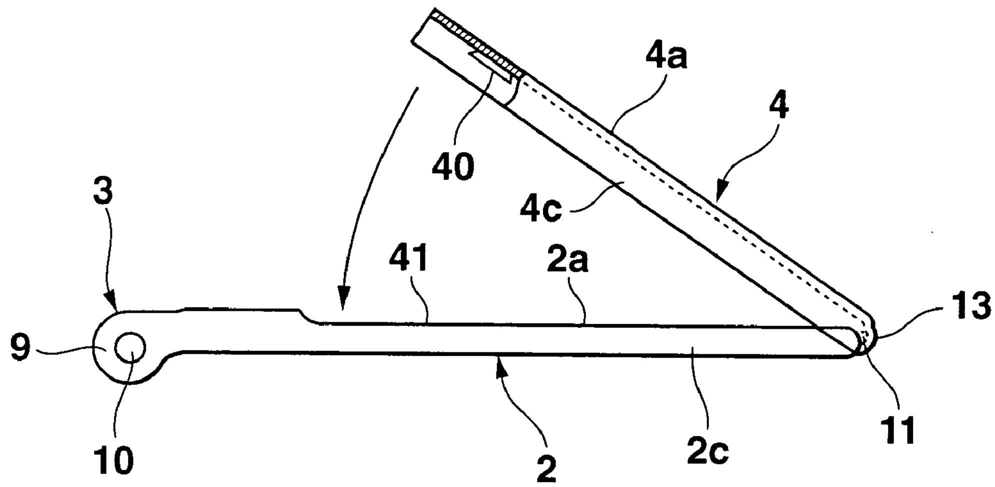
FIG. 23 is a side view showing a situation of mounting a cover member on a second case of an electronic dictionary of a sixth embodiment of the present invention.
Figure 24:
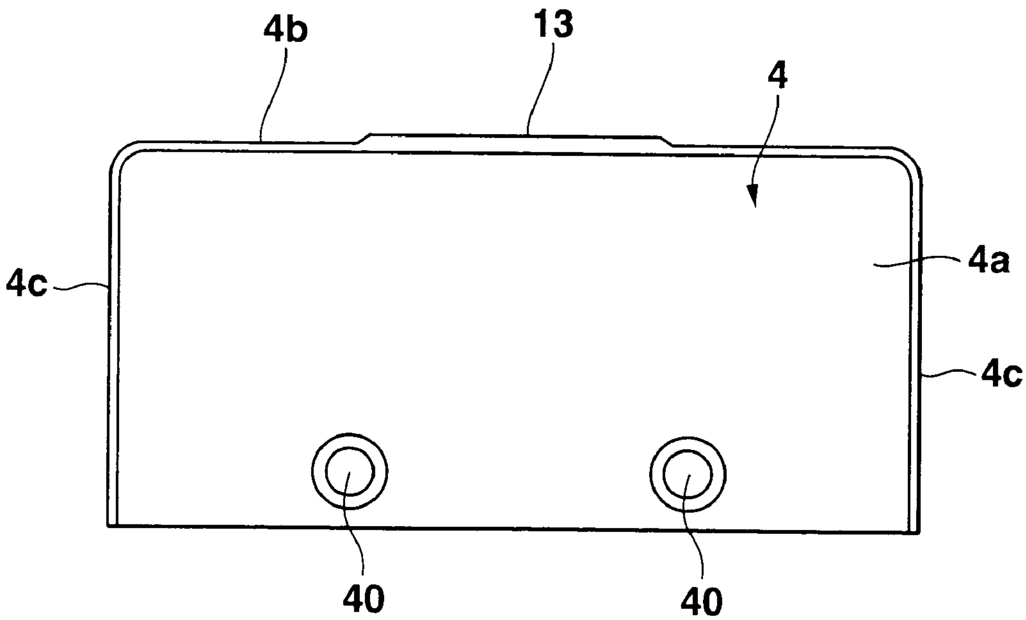
FIG. 24 is a view showing an inner surface of the cover member of FIG. 23.

Next, an electronic dictionary of a sixth embodiment of the present invention will be described with reference to FIGS. 23 to 25. Portions of the sixth embodiment similar to those of the first embodiment described above with reference to FIGS. 1 to 6 are denoted by the same reference numerals as those denoting the same portions of the first embodiment, and detailed description thereof will be omitted.

In the electronic dictionary, in place of the engaging portions 14 disposed on both right and left lateral side skirts 4*c* of the cover member 4, engaging portions having attractive members such as a pair of sucking disks 40 are disposed on an inner surface of a planar portion 4*a* of the cover member 4 in the vicinity of a hinge unit 3, and another engaging portion having an attractive member such as an attracted portion 41 is disposed on an outer surface 2*a* of a second case 2. Other components of the electronic dictionary of the sixth embodiment are the same as those of the first embodiment.

Figure 25:
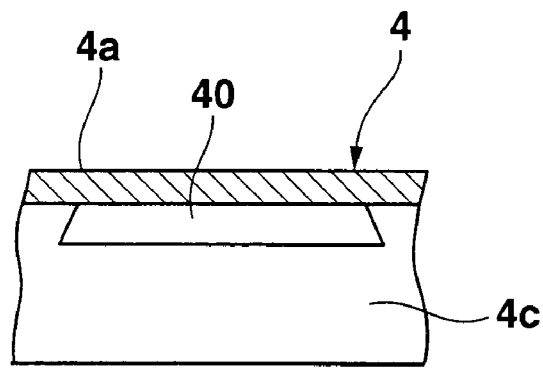
FIG. 25 is an enlarged sectional view of a main portion of the cover member of FIG. 23.

More specifically, each of the sucking disks 40 can be made of a soft synthetic resin such as vinyl chloride, and has a roughly dish shape as shown in FIG. 25. A bottom of each sucking disk 40 is attached to the inner surface of the planar portion 4*a* of the cover member 4. When the planar portion 4*a* of the cover member 4 is overlapped on the outer surface 2*a* of the second case 2 and the sucking disks 40 are pressed on the attracted portion 41 of the outer surface 2*a* of the second case 2, the dish-shaped sucking disks 40 are elastically deformed to discharge air from their indents, and attract the attracted portion 41 of the outer surface 2*a* of the second case 2. The attracted portion 41 of the second case 2 is constituted by smoothing a part of the outer surface 2*a* of the second case 2.

According to such an electronic dictionary, it is possible to obtain technical advantages similar to those of the first embodiment. Further, the following technical advantages can be obtained in the electronic dictionary. In a state in which the engaging portion 13 of the tip end skirt 4*b* of the cover member 4 is hooked on the engaging projection 11 of the tip end surface of the second case 2, the pair of sucking disks 40 attract the attracted portion 41 of the outer surface 2*a* of the second case 2 by pressing the cover 4 on the outer surface 2*a* of the second case 2. Thus, as in the case of the fourth embodiment, the cover member 4 can be detachably mounted on the second case 2 easily. Since the sucking disks 40 are disposed on the cover member 4, an appearance of the second case 2 is good even when the cover member 4 is removed from the second case 2.

Seventh Embodiment

Figure 26:
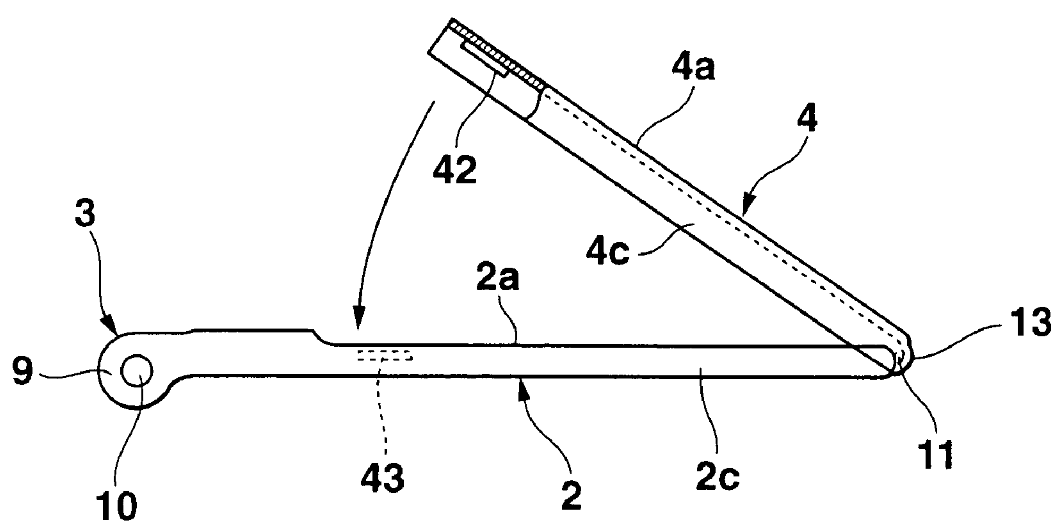
FIG. 26 is a side view showing a situation of mounting a cover member on a second case of an electronic dictionary of a seventh embodiment of the present invention.
Figure 27:
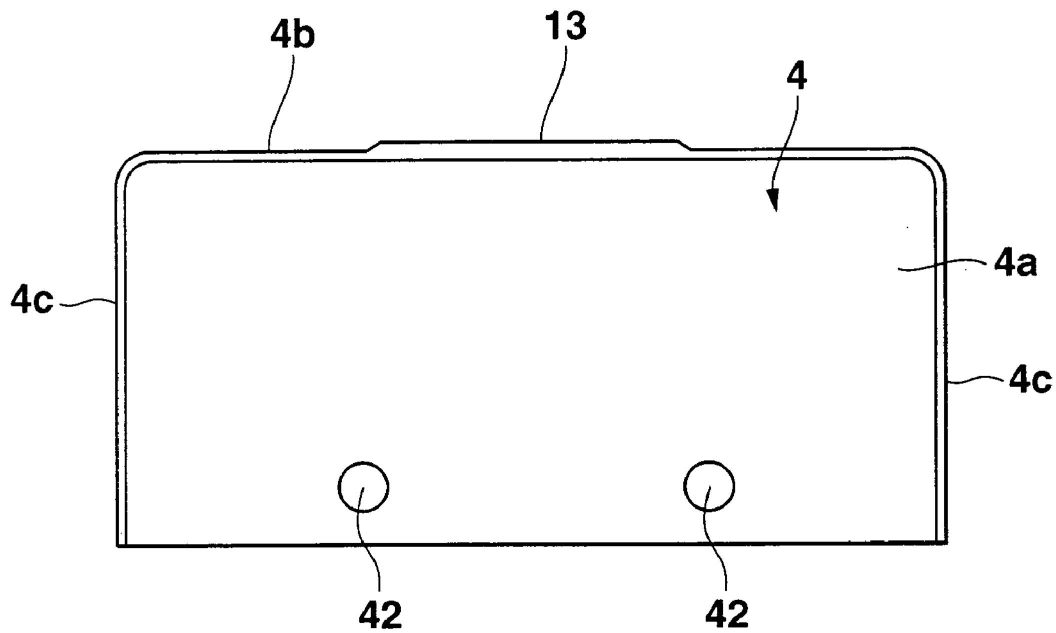
FIG. 27 is a view showing an inner surface of the cover member of FIG. 26.

Next, an electronic dictionary of a seventh embodiment of the present invention will be described with reference to FIGS. 26 and 27. Portions of the seventh embodiment similar to those of the sixth embodiment described above with reference to FIGS. 23 to 25 are denoted by the same reference numerals as those denoting the same portions of the sixth embodiment, and detailed description thereof will be omitted.

In the electronic dictionary, in place of the sucking disks 40 and the attracted surface 41 of the sixth embodiment, for example, a pair of magnets 42 as attracting members are disposed in an inner surface of a planar portion 4*a* of a cover member 4 in the vicinity of a hinge unit 3 and, for example, a pair of magnetic material portions 43 as other attractive members are disposed in an outer surface 2*a* of a second case 2 in the vicinity of the hinge unit 3. Other components of the electronic dictionary of the seventh embodiment are the same as those of the first embodiment.

According to such an electronic dictionary, it is possible to obtain technical advantages similar to those of the first embodiment. Further, the following technical advantages can be obtained in the seventh embodiment. That is, in a state in which the engaging portion 13 of the tip end skirt 4*b* of the cover member 4 is hooked on the engaging projection 11 of the tip end surface 2*b* of the second case 2, the cover member 4 is rotated toward the outer surface 2*a* of the second case 2, whereby the pair of magnets 42 disposed in the inner surface of the planar portion 4*a* of the cover member 4 and the pair of magnetic material portions 43 disposed in the outer surface 2*a* of the second case are attracted each other by magnetic forces. Thus, as in the case of the sixth embodiment, the cover member 4 can be detachably mounted on the second case 2 easily. Since the magnetic material portions 43 are embedded in the outer surface 2*a* of the second case 2 in this embodiment, an appearance of the second case 2 is good even when the cover member 4 is removed from the second case 2.

According to the seventh embodiment, the magnets 42 are disposed in the cover member 4, and the magnetic material portions 43 are embedded in the second case 2. However, instead of this structure, for example, a structure may be employed in which at least one magnet 42 is embedded in the outer surface 2*a* of the second case 2 and the cover member 4 is made of a magnetic material or at least one magnetic material portion is embedded in the inner surface of the cover member 4. With this alternative structure, technical advantages similar to those of the seventh embodiment can be obtained. Moreover, even when the cover member 4 is removed from the second case 2, appearances of the second case 2 and the cover member 4 are both good because the magnet 42 is not exposed on the outer surface 2*a* of the second case 2 and the magnetic material portion 43 is not exposed on the cover member 4.

Eighth Embodiment

Figure 28:
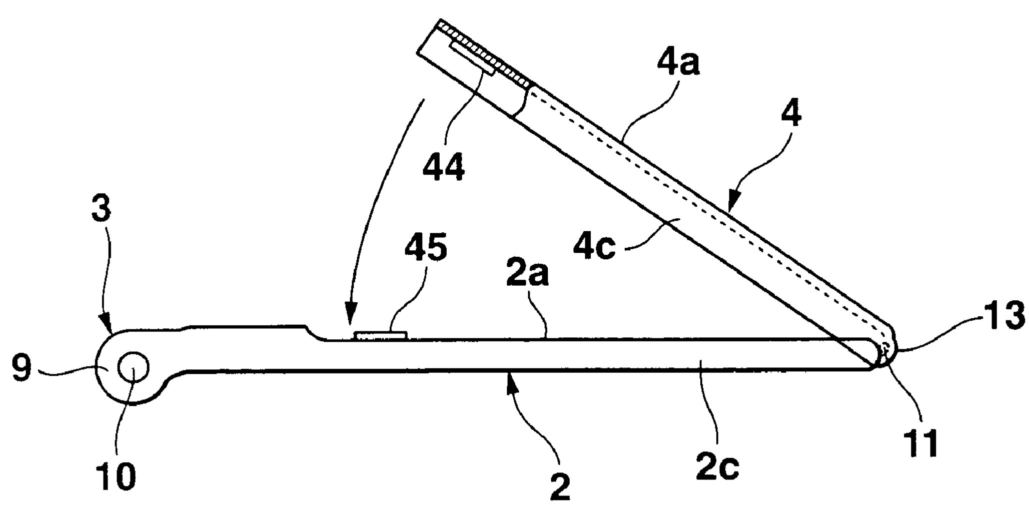
FIG. 28 is a side view showing a situation of mounting a cover member on a second case of an electronic dictionary of an eighth embodiment of the present invention.
Figure 29:
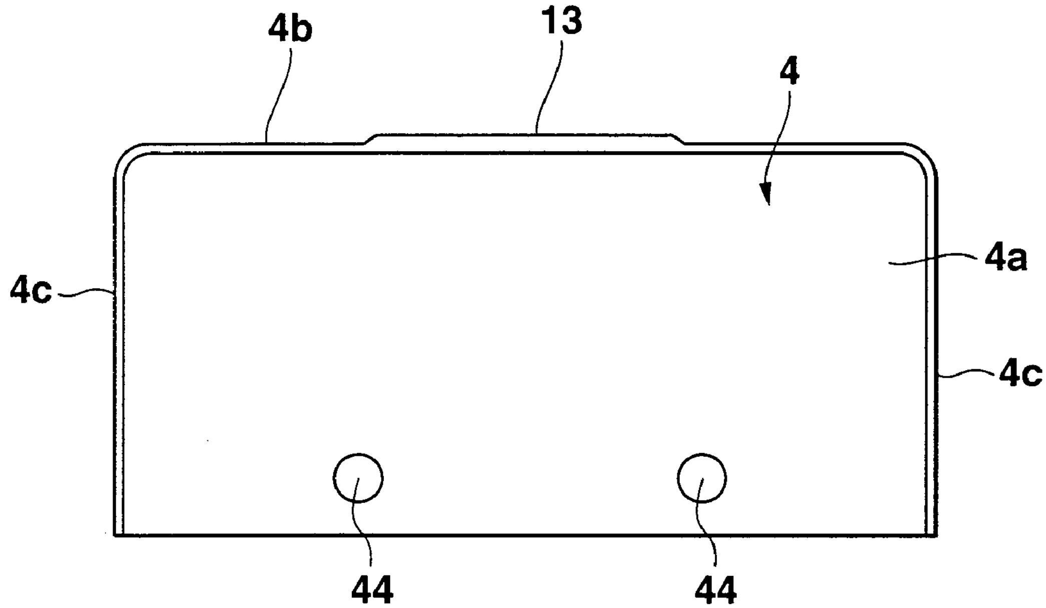
FIG. 29 is a view showing an inner surface of the cover member of FIG. 28.

Next, an electronic dictionary of an eighth embodiment of the present invention will be described with reference to FIGS. 28 and 29. Portions of the eighth embodiment similar to those of the seventh embodiment described above with reference to FIGS. 26 and 27 are denoted by the same reference numerals as those denoting the same portions of the seventh embodiment, and detailed description thereof will be omitted.

In the electronic dictionary, in place of the magnets 42 and the magnetic material portions 43 of the seventh embodiment, a pair of male surface fasteners 44 as the engaging portion are disposed on an inner surface of a planar portion 4*a* of a cover member 4 in the vicinity of a hinge unit 3, and a pair of female surface fasteners 45 as the engaging portion are disposed on an outer surface 2*a* of a second case 2 in the vicinity of the hinge unit 3. Other components of the electronic dictionary of the eighth embodiment are the same as those of the seventh embodiment.

According to such an electronic dictionary, it is possible to obtain technical advantages similar to those of the first embodiment. Further, the following technical advantages can be obtained. In a state in which the engaging portion 13 of the tip end skirt 4*b* of the cover member 4 is hooked on the engaging projection 11 of the tip end surface 2*b* of the second case 2, the cover member 4 is pressed on the outer surface 2*a* of the second case 2 so that the pair of male surface fasteners 44 of the cover member 4 and the pair of female surface fasteners 45 of the second case 2 are fastened to each other. Thus, the cover member 4 can be mounted on the second case 2. Therefore, as in the case of the seventh embodiment, the cover member 4 can be detachably mounted on the second case 2 easily in this eighth embodiment.

Ninth Embodiment

Figure 30:
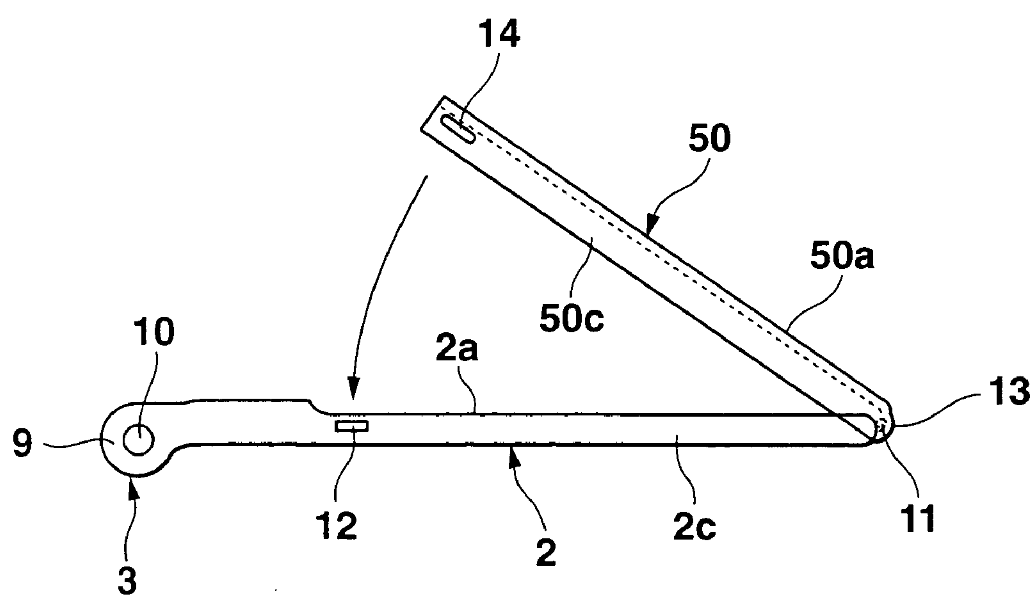
FIG. 30 is a side view showing a situation of mounting a cover member on a second case of an electronic dictionary of a ninth embodiment of the present invention.
Figure 31:
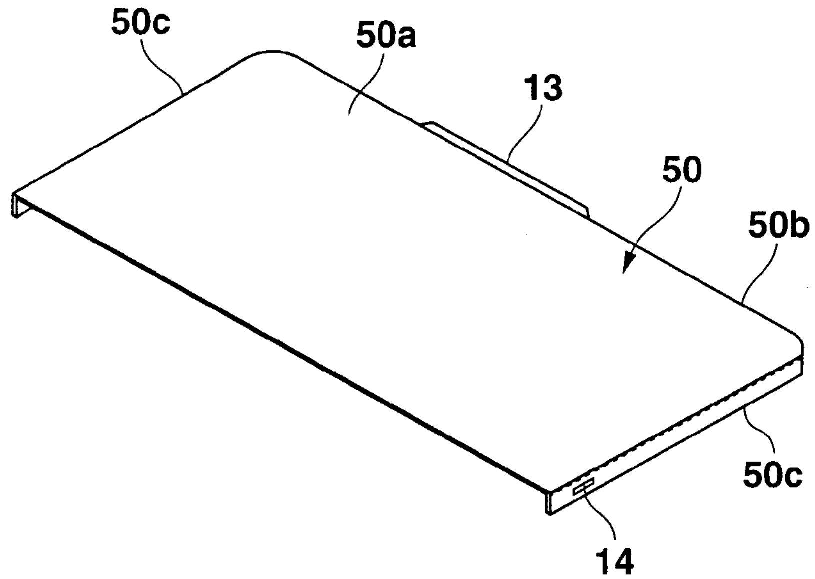
FIG. 31 is a perspective view of the cover member of FIG. 30.
Figure 32:
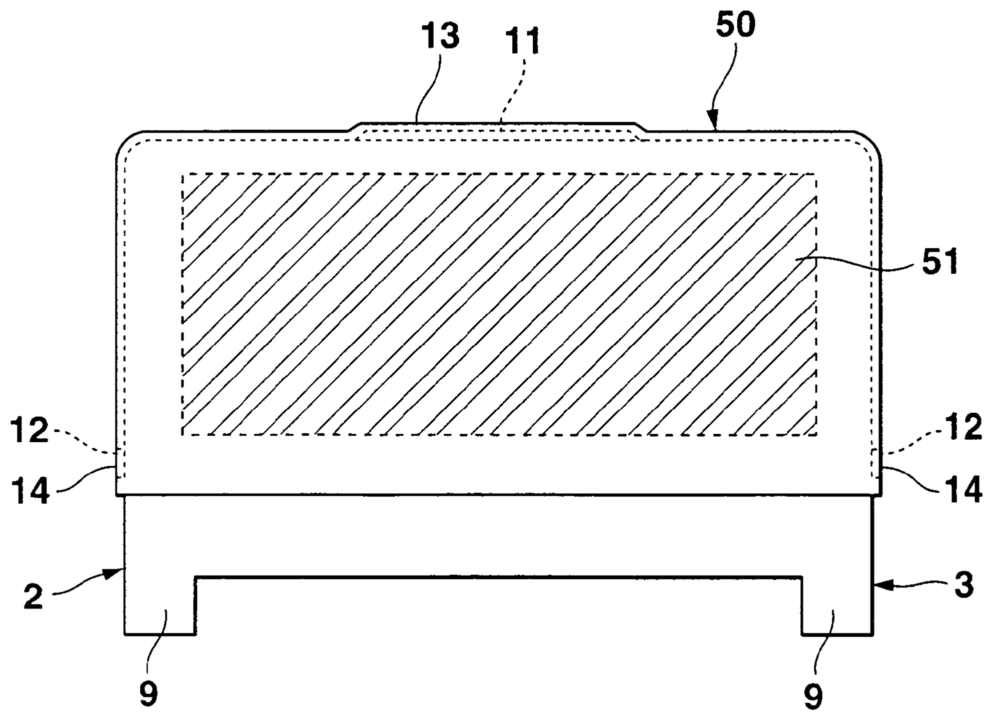
FIG. 32 is a front view showing a state in which the cover member is mounted on the second case of the electronic dictionary of FIG. 30.

Next, an electronic dictionary of a ninth embodiment of the present invention will be described with reference to FIGS. 30 to 32. Portions of the ninth embodiment similar to those of the first embodiment described above with reference to FIGS. 1 to 6 are denoted by the same reference numerals as those denoting the same portions of the first embodiment, and detailed description thereof will be omitted.

A cover member 50 of the electronic dictionary is made of a transparent synthetic resin. Other components of the electronic dictionary of the ninth embodiment are the same as those of the first embodiment.

The cover member 50 is made of a transparent synthetic resin such as a polycarbonate or ABS resin. As in the case of the cover member 4 of the electronic dictionary of the first embodiment, the cover member 50 comprises a planar portion 50*a* arranged to overlap with an outer surface 2*a* of a second case 2, an end skirt 50*b* arranged to overlap with a tip end surface (upper side in FIG. 32) of the second case 2, and both lateral side skirts 50*c* arranged to overlap with both right and left lateral side surfaces 2*c* of the second case 2. In this case, as shown in FIGS. 30 and 31, engaging portions 13, 14 are formed on the end skirt 50*b* and both lateral side skirts 50*c* of the cover member 50 to be detachably engaged with engaging projections 11, 12 on the end surface 2*c* and both lateral side surfaces 2*c* of the second case 2.

According to such an electronic dictionary, it is possible to obtain technical advantages similar to those of the first embodiment. Further, the following technical advantages can be obtained in the ninth embodiment. Since the cover member 50 is made of a transparent synthetic resin, when the cover member 50 is mounted on the second case 2, as indicated by a hatched line in FIG. 32, a decoration sheet 51 such as a photograph, a calendar, or a picture can be held between the inner surface of the planar portion 50*a* of the cover member 50 and the outer surface 2*c* of the second case 2, and the electronic device can be used in this state. Thus, an user can easily obtain an electronic dictionary which has his or her favorite appearance.

Tenth Embodiment

Figure 33:
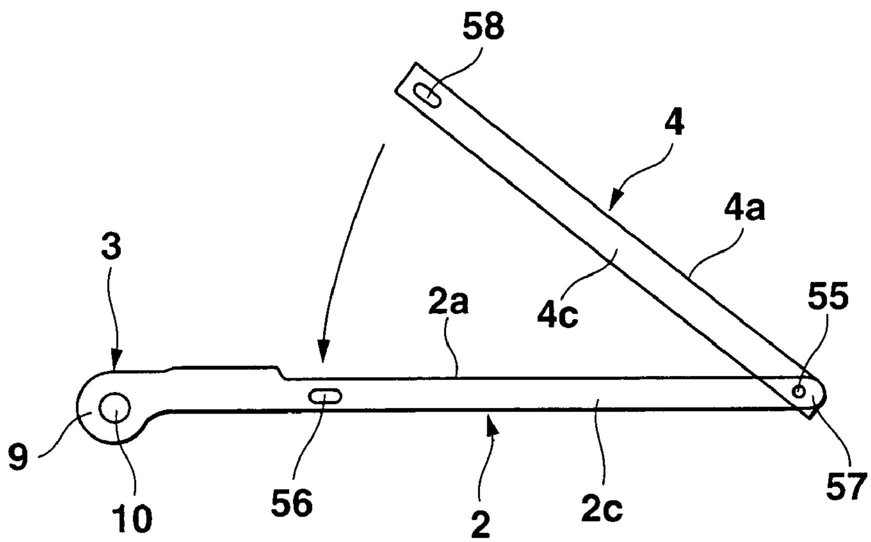
FIG. 33 is a side view showing a situation of mounting a cover member on a second case of an electronic dictionary of a tenth embodiment of the present invention.

Next, an electronic dictionary of a tenth embodiment of the present invention will be described with reference to FIGS. 33 to 35. Portions of the tenth embodiment similar to those of the first embodiment described above with reference to FIGS. 1 to 6 are denoted by the same reference numerals as those denoting the same portions of the first embodiment, and detailed description thereof will be omitted.

In the electronic dictionary, engaging portions 55, 56 are disposed at tip end portions on both lateral side surfaces 2*c* of a second case 2 and at base end portions on both lateral side surfaces 2*c* of the second case 2, the tip end portions being positioned away from a hinge unit 3 and the base end portions being positioned near to the hinge unit 3. Further, engaging portions 57, 58 are disposed at tip end portions on both lateral side skirts 4*c* of a cover member 4 and at base end portions on both lateral side skirts 4*c* of the cover member 4, the tip end portions being positioned away from the hinge unit 3 and the base end portions being positioned near to the hinge unit 3.

The pair of engaging portions 57 positioned at the tip end portions on both lateral side skirts 4*c* of the cover member 4 are rotatably engaged with the pair of engaging projections 55 positioned at the tip end portions on both lateral side surfaces 2*c* of the second case 2. As shown in FIG. 35, a mirror 59 is disposed on an inner surface of the cover member 4. Other components of the electronic dictionary of the tenth embodiment are similar to those of the first embodiment.

Figure 34:
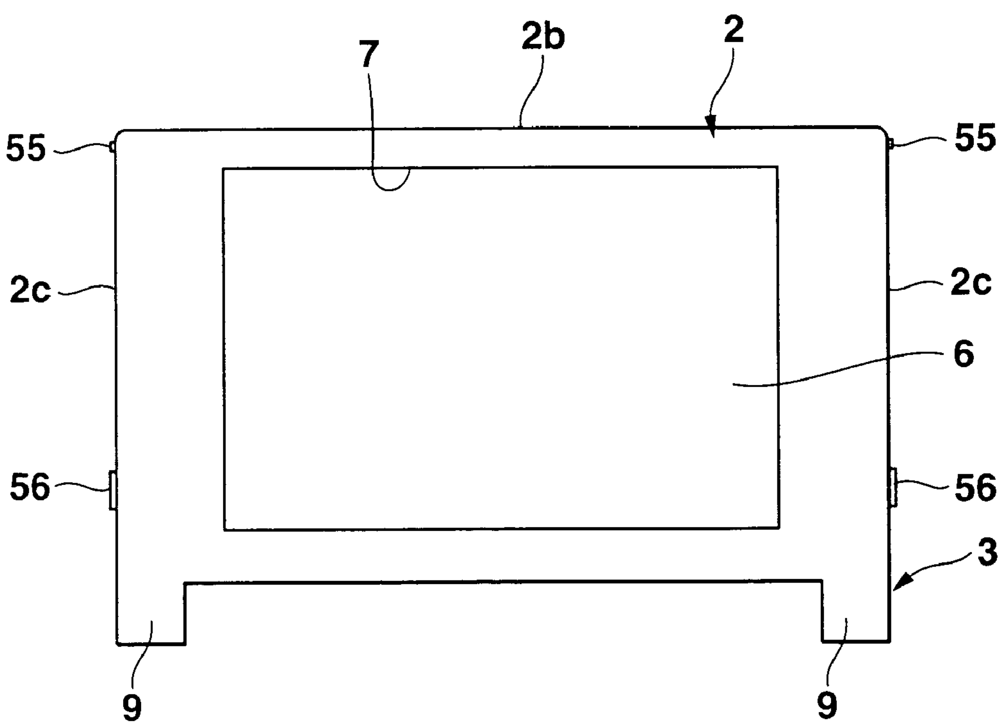
FIG. 34 is a view showing an inner surface of the second case of FIG. 33.
Figure 35:
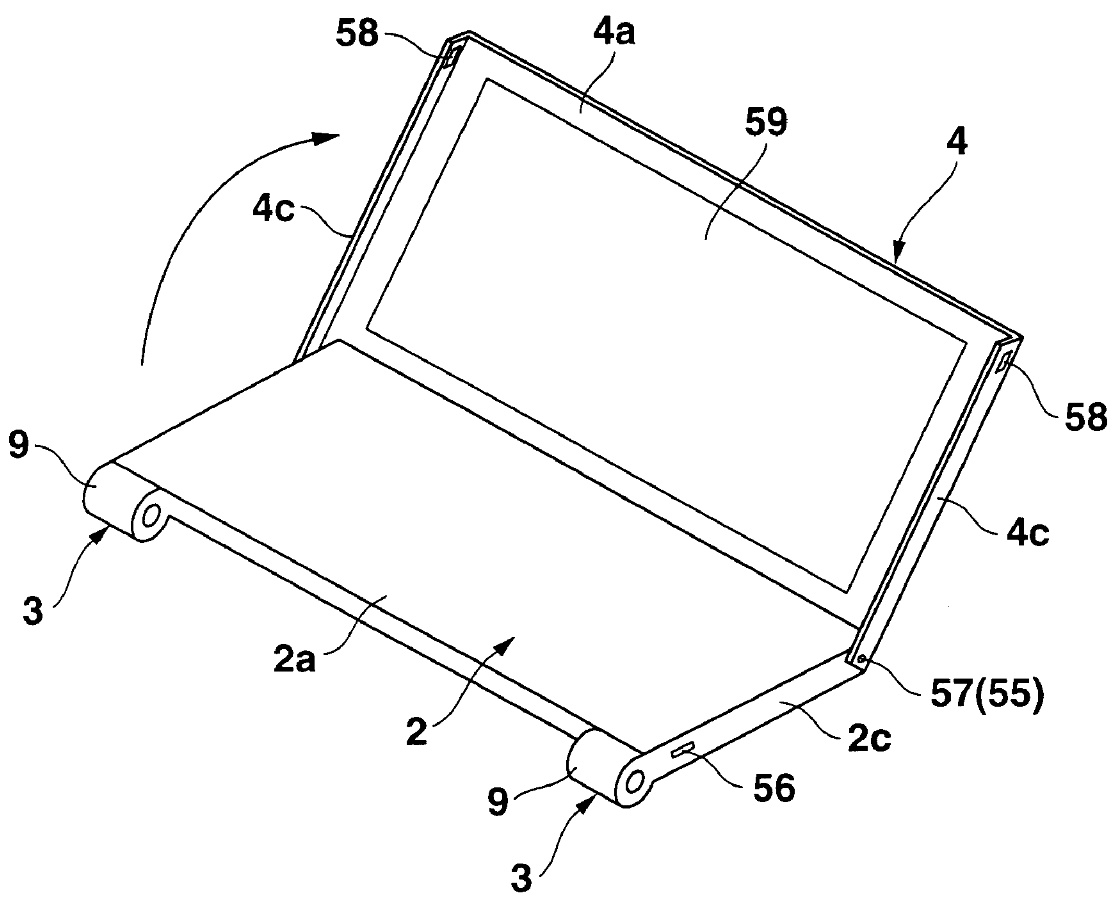
FIG. 35 is a perspective view showing an open state set by rotating the cover member of FIG. 34 with respect to the second case of FIG. 33.

More specifically, each of the pair of engaging portions 55 at the tip end portions (right end portions in FIG. 33) on both lateral side surfaces 2*c* of the second case 2 has a nearly semispherical projecting shape as shown in FIG. 34, and each of the pair of engaging portions 56 at the base end portions (left end portions in FIG. 33) on both lateral side surfaces 2*c* of the second case 2 has a thin and long projecting shape as in the case of the first embodiment. The nearly semispherical engaging portion 55 and the engaging portion 56 of the thin and long projecting shape are formed to provide decoration to the second case 2. Additionally, each of the pair of engaging portions 57 at the tip end portions (right end portions in FIG. 33) on both lateral side skirts 4*c* of the cover member 4 is formed in a nearly semispherical concave shape so that each of the pair of engaging portions 55 of the second case 2 can be detachably and rotatably engaged therewith. Each of the pair of engaging portions 58 on the base end portions (left upper end portions in FIG. 33) on both lateral side skirts 4*c* of the cover member 4 is formed in a thin and long hole shape so that each of the pair of engaging portions 56 of the second case can be detachably engaged therewith.

According to such an electronic dictionary, the cover member 4 can be detachably mounted on the second case 2 by detachably engaging the engaging portions 57, 58 of the cover member 4 with the engaging portions 55, 56 of the second case 2. Thus, technical advantages similar to those of the electronic dictionary of the first embodiment can be obtained in the tenth embodiment. Further, when the pair of engaging portions 58 positioned in the vicinity of the hinge unit 3 on the cover member 4 are separated from the pair of engaging portions 56 positioned in the vicinity of the hinge unit 3 on the second case 2, the cover member 4 can be rotated around the pair of engaging portions 57 positioned away from the hinge unit 3 on the cover member 4 and the pair of engaging portions 55 positioned away from the hinge unit 3 on the second case 2 so that the cover member 4 can be openable and closeable with respect to the second case 2. When the cover member 4 is rotated to an open position with respect to the second case 2, as shown in FIG. 35, the mirror 59 on the inner surface of the planar portion 4*a* of the cover member 4 is exposed to the outside, and the exposed mirror 59 can be used as, e.g., a cosmetic or vanity mirror.

According to the tenth embodiment, each of the pair of engaging portions 56 in the vicinity of the hinge unit 3 on the second case 2 has a projecting shape. However, for example, the projectable and retractable engaging portion 20 of the fourth embodiment shown in FIG. 18 can be used instead of each of the pair of engaging portions 56 in the vicinity of the hinge unit 3 on the second case 2. In place of the engaging portions 58 and the engaging portions 56 in the vicinity of the hinge unit 3 on the second case 2 and on the cover member 4, as in the cases of the sixth and seventh embodiments shown in FIGS. 23 to 27, at least one attractive member such as the sucking disk 40 and the magnet 42 may be disposed as an engaging portion on the inner surface of the planar portion 4*a* of the cover member 4, and at least another attractive member such as an attracted portion 41 and the magnetic material portion 43 may be disposed on the outer surface 2*a* of the second case 2, whereby the cover member 4 and the second case 22 may be attracted to each other to mount the cover member 4 on the outer surface of the second case 2. Alternatively, in place of the engaging portion 58 and the engaging portion 56 of the tenth embodiment, as in the case of the eighth embodiment shown in FIGS. 28 and 29, male and female surfaces fasteners 44, 45 may be disposed on the inner surface of the planar portion 4*a* of the cover member 4 and the outer surface 2*a* of the second case 2, whereby the cover member 4 and the second case 2 can be detachably fastened to each other to mount the cover member 4 on the outer surface of the second case 2. According to both of such modifications, technical advantages similar to those of the tenth embodiment can be obtained.

Eleventh Embodiment

Next, a mobile telephone of an eleventh embodiment of the present invention will be described with reference to FIGS. 36 to 39. Portions of the eleventh embodiment similar to those of the first embodiment described above with reference to FIGS. 1 to 6 are denoted by the same reference numerals as those denoting the same portions of the first embodiment, and detailed description thereof will be omitted.

Figure 36:
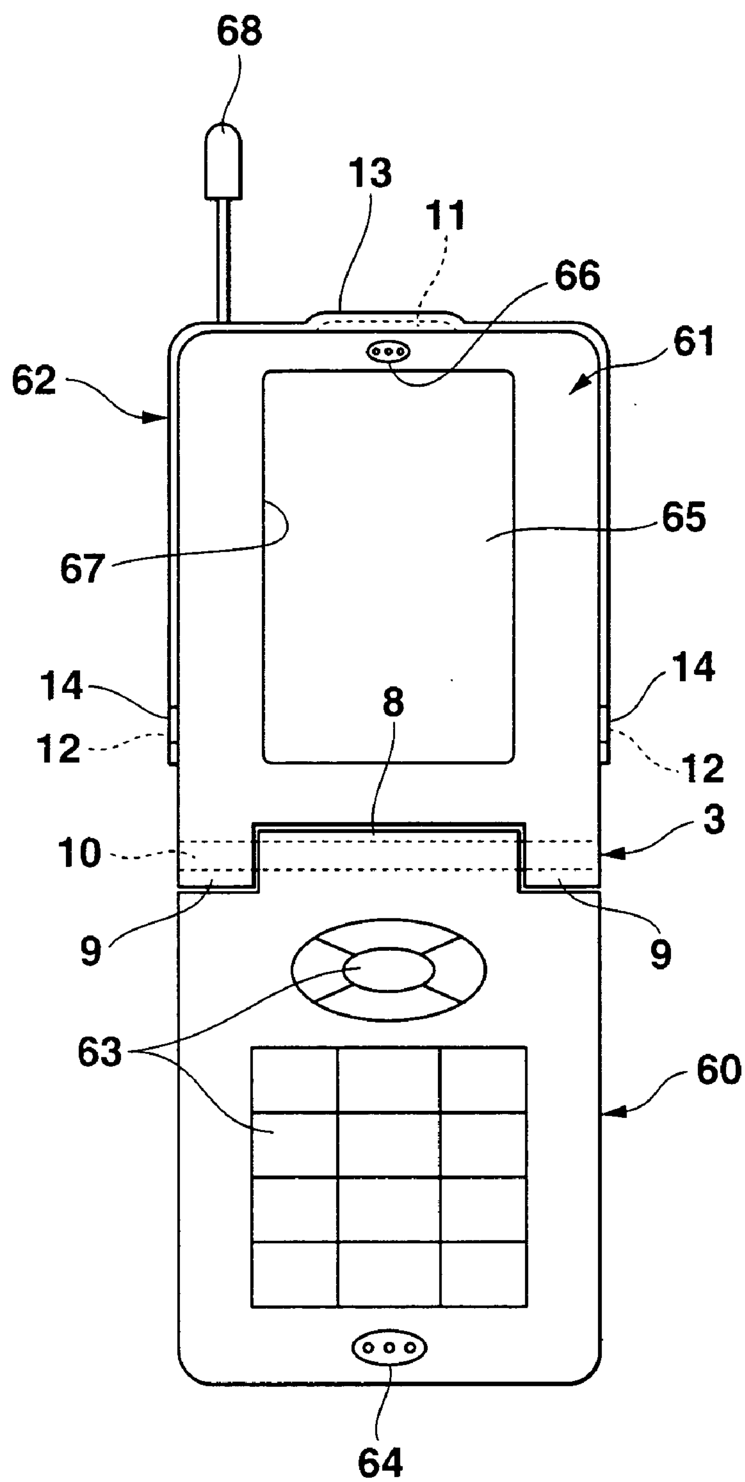
FIG. 36 is a front view showing a mobile telephone of an eleventh embodiment of the present invention in a folded-out state for use, in which a cover member is mounted on the mobile telephone.
Figure 37:
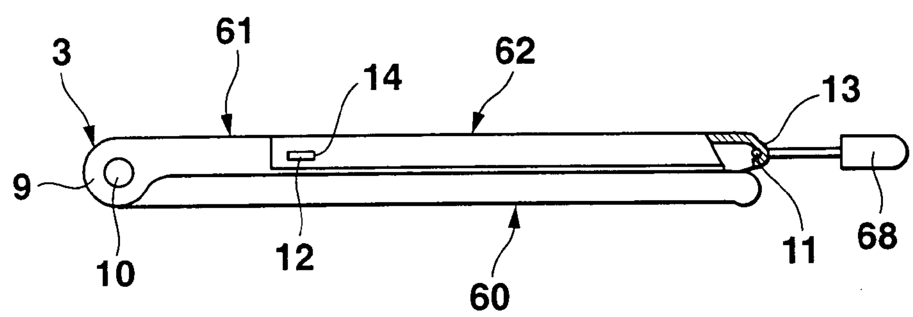
FIG. 37 is a partially broken side view showing the mobile telephone of FIG. 36 on which the cover member is mounted, in a closed state.

As shown in FIGS. 36 and 37, the mobile telephone comprises first and second cases 60, 61, a hinge unit 3 which connects the first and second cases 60 and 61 with each other so that the first and second cases 60, 61 are openable and closeable each other, and a decoration cover member 62 detachably mounted on an outer surface of the second case 61.

As shown in FIGS. 36 and 37, the first case 60 is formed in a nearly flat plate shape which is long, and a plurality of keys of a keyboard 63 and a microphone 64 are disposed in an inner surface of the first case 60, the inner surface facing the second case 61 when the first case 60 and the second case 61 are closed each other. The plurality of keys of the keyboard 63 include various keys such as a dial key and a cursor key which are necessary for telephone functions. The microphone 64 is arranged at a tip end portion (bottom end portion in FIG. 36) in the inner surface of the first case 60, the tip end portion being positioned away from the hinge unit 3.

As shown in FIGS. 36 and 37, the second case 61 has a flat plate shape of a size approximately equal to that of the first case 60, and a display unit 65 and a speaker 66 are disposed in the inner surface of the second case 61, the inner surface facing the first case 60 when the first case 60 and the second case 61 are closed each other. The display unit 65 comprises a planar display device similar to that of the display unit 6 of the first embodiment and, as shown in FIGS. 36 and 37, a screen of the planar display device is exposed in an opening 67 formed in the inner surface of the second case 61. The speaker 66 is arranged at a tip end portion (upper end portion in FIG. 36) in the inner surface of the second case 61, the tip end portion being positioned away from the hinge unit 3. A telescopic antenna 68 is disposed in the tip end portion (upper end portion in FIG. 36) of the second case 61.

As in the case of the cover member 4 of the first embodiment, the cover member 62 is a thin metal plate made of a stainless or the like, and formed, as shown in FIG. 37, to cover an outer surface (upper surface in FIG. 37) of the second case 61, a tip end surface (upper end surface in FIG. 36) of the second case 61, and both right and left lateral side surfaces of the second case 61, the tip end surface being positioned away from the hinge unit 3. At least one of various designs such as a color, a pattern, a graphic and a mark is formed on the cover member 62, and a plurality of cover members 62 different from one another in design are prepared.

Figure 38:
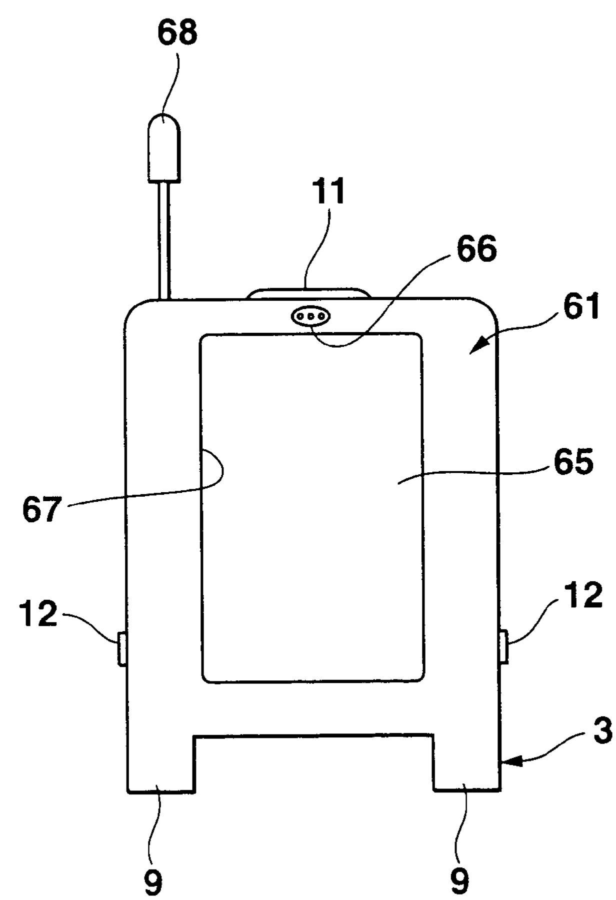
FIG. 38 is a front view showing a second case of the mobile telephone of FIG. 36 in a cover member removed state.

As shown in FIG. 38, engaging projections 11, 12 are disposed on an end surface of the tip end portion (upper end portion in FIG. 36) of the second case 61 and on both right and left lateral side surfaces thereof to provide decoration to the end surface and both right and left lateral side surfaces of the second case 61.

Figure 39:
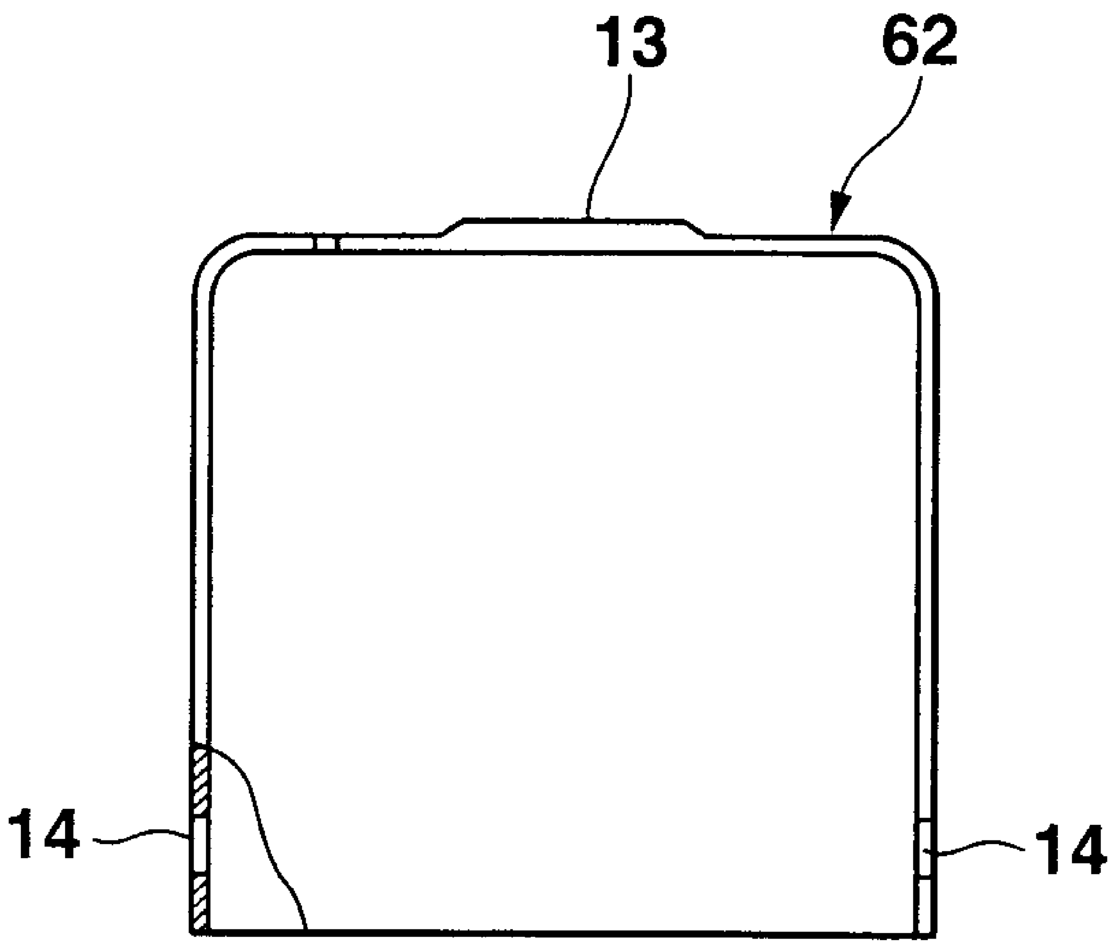
FIG. 39 is a view showing an inner surface of the cover member of FIG. 37.

As shown in FIG. 39, engaging portions 13, 14 which are detachably engaged with the engaging projections 11, 12 on the end surface and on both lateral side surfaces of the second case 61 are formed on a tip end skirt and both lateral side skirts of the cover member 62. Similarly to the first embodiment, the engaging portion 13 of the tip end skirt of the cover member 62 which is engaged with the engaging projection 11 of the end surface of the second case 61 has a concavity formed in an inner surface of a projection disposed on the tip end skirt of the cover member 62 and having a semicircular cross section. The engaging portions 14 on both lateral side skirts of the cover member 62 which are engaged with the engaging projections 12 on both lateral side surfaces of the second case 61 are formed to be thin and long holes similar to the engaging projections 12 on both lateral side surfaces of the second case 61.

According to such a mobile telephone, when the first case 60 and the second case 61 are rotated around the hinge unit 3 to be opened, as shown in FIG. 36, the plurality of keys of the keyboard 63 and the microphone 64 in the first case 61 are exposed to external space, and the screen of the display unit 65 and the speaker in the second case 61 are also exposed to the external space. Thus, while the screen of the display unit 65 is watched, a dial operation or a data input/output operation for an internal electric and/or electronic unit of at least one of the first case 60 and the second case 61 is carried out though the plurality of keys of the keyboard 63, whereby data can be entered into or outputted from the electric and/or electronic unit. When the first case 60 and the second case 61 are rotated around the hinge unit 3 to be closed, as shown in FIG. 37, the first case 60 and the second case 61 overlap each other to make the mobile telephone compact. Thus, portability of the mobile telephone can be improved. In this case, it is possible to obtain advantages of the decoration of the outer surface of the cover member 62 mounted on the second case 61.

Thus, as in the case of the electronic dictionary of the first embodiment, according to the mobile telephone, by detachably engaging the engaging portions 13, 14 of the cover member 62 with the engaging projections 11, 12 disposed in at least the second case 61 of the first and second cases 60, 61, the cover member 62 for decoration can be detachably mounted on the outer surface of the second case 61. Accordingly, free replacement can be made among the plural kinds of cover members 62 for decoration which are prepared beforehand, and the design such as a color, a graphic, or a pattern for the surface of the mobile telephone can be freely changed in accordance with user's taste. When the cover member 62 is removed from the second case 61, the engaging projections 11, 12 disposed on the end surface and both lateral side surfaces of the second case 61 are exposed to the external space. However, the engaging projections 11, 12 of the second case 61 also provide decorativeness to the outer surface of the second case 61. Thus, a good appearance can be provided to the mobile telephone in a state in which the cover member 62 is removed from the second case 61.

According to the mobile telephone, the engaging projections 11, 12 of the second case 61 are disposed on the end surface of the second case 61 and on both lateral side surfaces of the second case 61 in the vicinity of the hinge unit 3, the end surface being positioned away from the hinge unit 3. Further, the engaging portions 13, 14 of the cover member 62 are disposed on the tip end skirt of the cover member 62 and on both lateral side skirts of the cover member 62 in the vicinity of the hinge unit 3, the tip end skirt being positioned away from the hinge unit 3, to correspond to the tip end surface and both lateral side surfaces of the second case 61. Thus, when the cover member 62 is mounted on the second case 61, as in the case of the first embodiment, the cover member 62 can be mounted on the outer surface of the second case 61 in a sure and stable state.

According to the eleventh embodiment, the cover member 62 is detachably mounted on the second case 61 by detachably engaging the engaging portions 13, 14 of the tip end skirt and both lateral side skirts of the cover member 62 with the engaging projections 11, 12 of the end surface and both lateral side surfaces of the second case 61. However, instead of this structure, as a structure for detachably mounting the cover member 62 on the second case 61, one of the structures of the second to tenth embodiments may be employed.

According to the first to eleventh embodiments, the cover member 4 or 62 is detachably mounted on the outer surface of the second case 2 or 61 while the first and second cases 1, 2 or 60, 61 are connected to each other by the hinge unit 3 so as to be openable and closeable. However, instead of these structures, the cover member 4 or 62 may be detachably mounted on the outer surface of the first case 1 or 60. The cover member 4 or 62 may be detachably mounted on the outer surfaces of both of the first and second cases 1, 2 or 60, 61.

Furthermore, the first to tenth embodiments are the electronic dictionaries, and the eleventh embodiment is the mobile telephone. However, these electronic dictionary and mobile telephone can be replaced by Personal Digital Assistants (PDA) such as electronic databooks or mobile electronic devices.

Twelfth Embodiment

Next, an electronic dictionary of a twelfth embodiment of the present invention will be described with reference to FIGS. 40 to 46.

Figure 40:
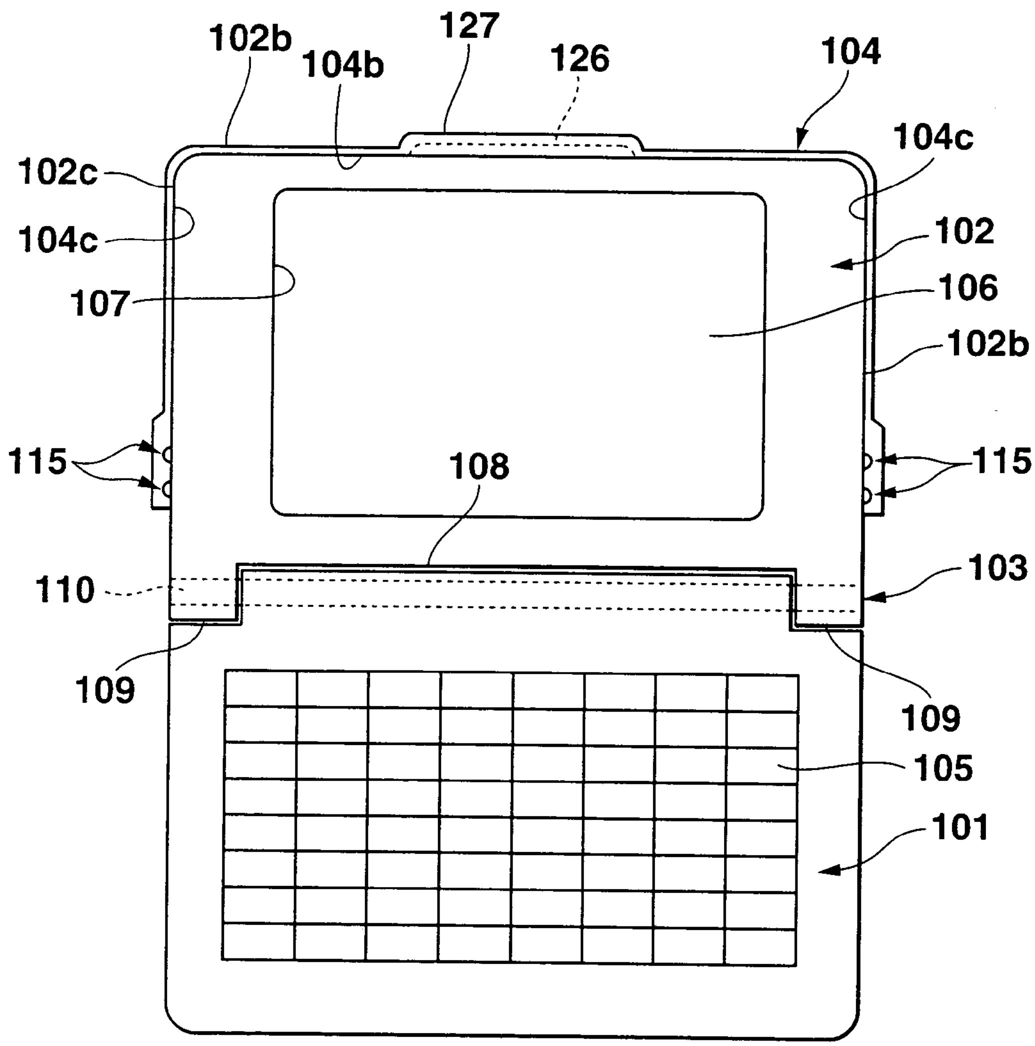
FIG. 40 is a front view showing an electronic dictionary of a twelfth embodiment of the present invention in a folded-out state for use, in which a cover member is mounted on the electronic dictionary.
Figure 41:
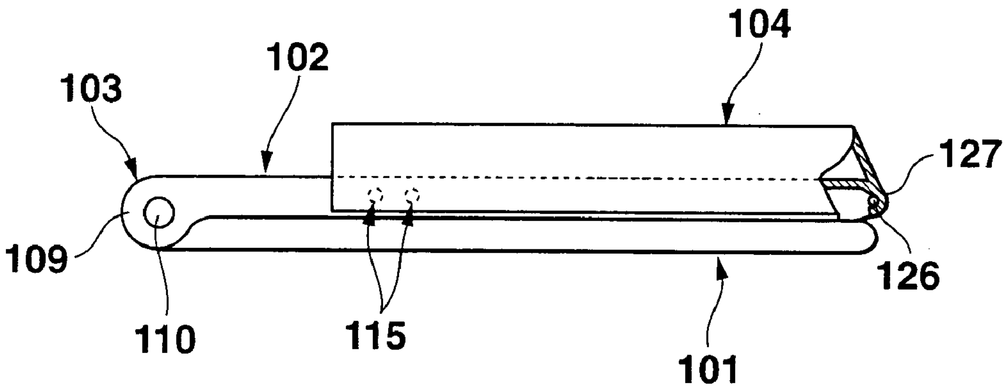
FIG. 41 is a partially broken side view showing the electronic dictionary of FIG. 40 on which the cover member is mounted, in a closed state during carrying.

As shown in FIGS. 40 and 41, the electronic dictionary comprises first and second cases 101 and 102, a hinge unit 103 which connects the first and second cases 101 and 102 with each other so that the first and second cases 101 and 102 are openable and closeable, and a cover case 104 for additioning further functions disposed on an outer surface of the second case 102. As shown in FIG. 40, the first case 101 is formed in a nearly flat plate shape which is long in lateral directions, and a keyboard 105 is disposed therein. The keyboard 105 has various keys such as character, cursor and function keys necessary for dictionary functions, and these keys are exposed in an inner surface of the first case 101, the inner surface facing the second case 102 when the first and second cases 101 and 102 are closed each other.

Figure 42:
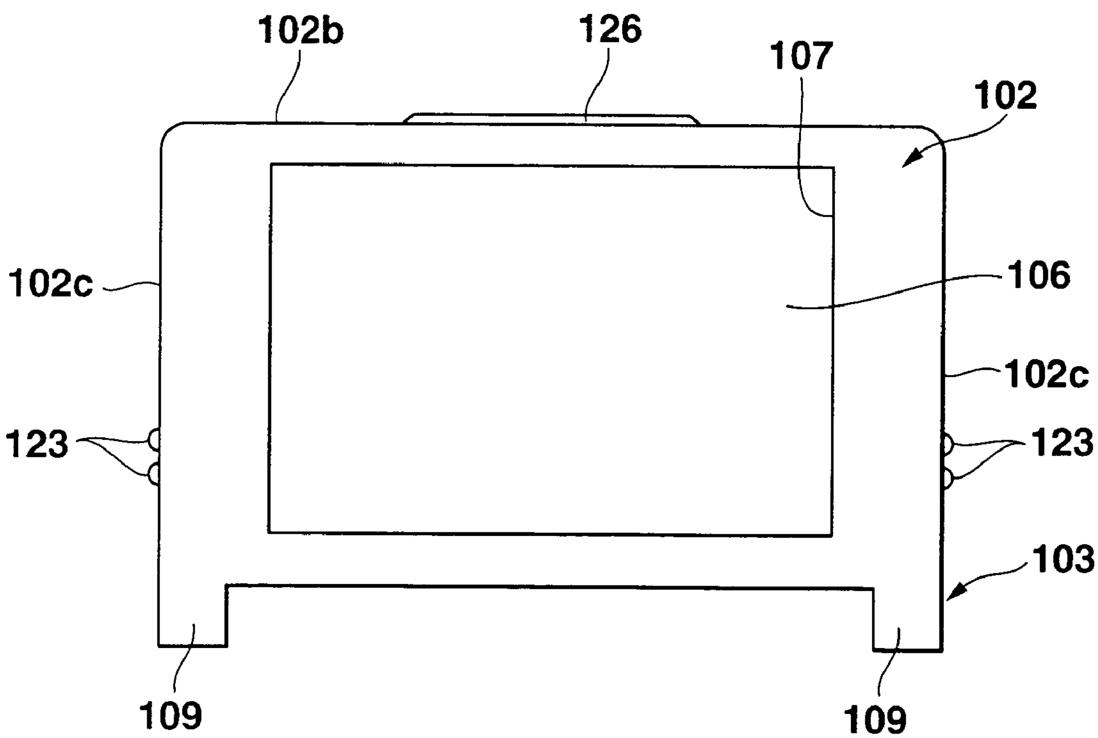
FIG. 42 is a front view showing only a second case of the electronic dictionary of FIG. 40.

As shown in FIGS. 40 to 42, the second case 102 has a flat plate shape of a size approximately equal to that of the first case 101, and a display unit 106 is disposed therein. The display unit 106 is used for electrically and optically displaying information such as dictionary data, and comprises a planar display device such as a liquid crystal display device or an electroluminescence (EL) device. As shown in FIGS. 40 and 42, a screen of the display unit 106 is exposed in an opening 107 formed in an inner surface of the second case 102, the inner surface facing the first case 101 when the first and second cases 101 and 102 are closed each other.

As shown in FIG. 40, the hinge unit 103 comprises a first projecting portion 108 disposed on an end surface of the first case 101 excluding both lateral sides thereof, and a pair of second projecting portions 109 disposed on both lateral sides of an end surface of the second case 102. The first and second projecting portions 108, 109 are rotatably connected to each other by a connecting rod 110 in a state in which the first projecting portion 108 of the first case 101 is arranged between the pair of second projecting portions 109 of the second case 2. Electric and/or electronic units in the first and second cases 101, 102 are electrically connected to each other through the hinge unit 3 by a well-known connection member (not shown) such as a flexible wiring board.

Figure 43:
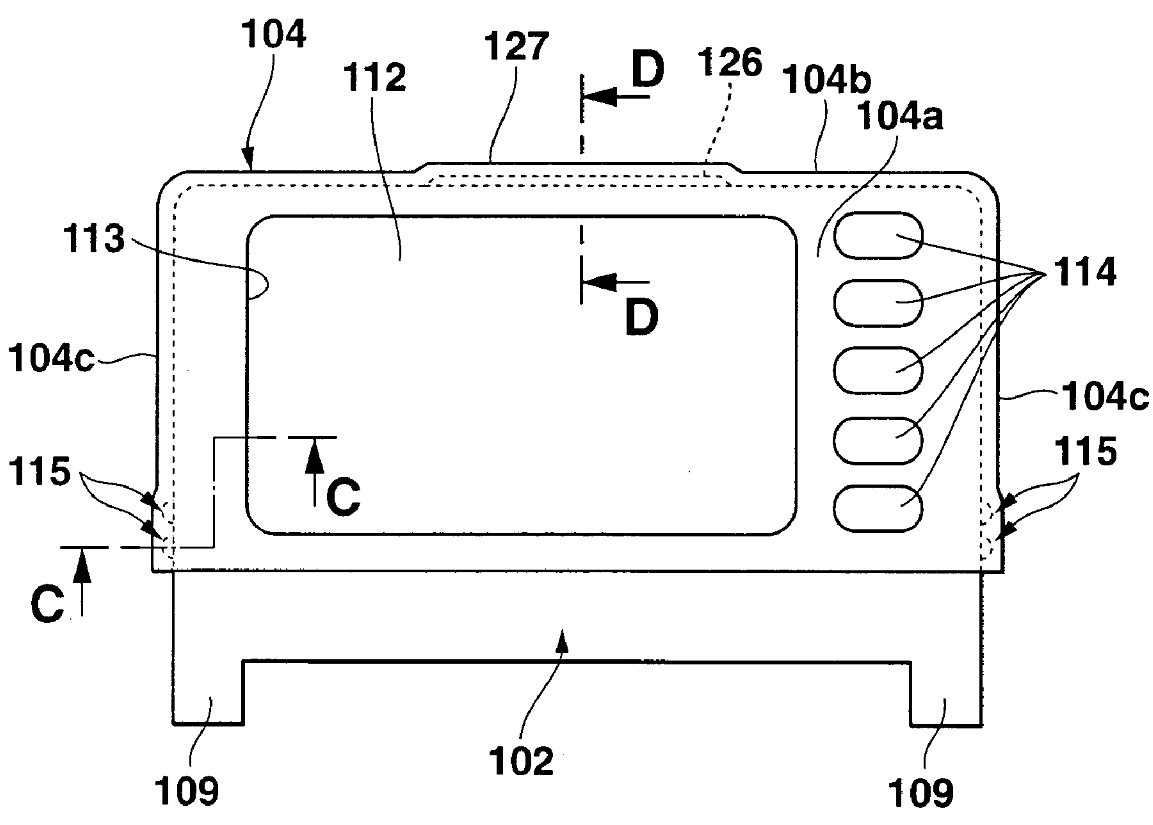
FIG. 43 is a front view of the second case of the electronic dictionary of FIG. 41 on which the cover member is mounted.
Figure 44:
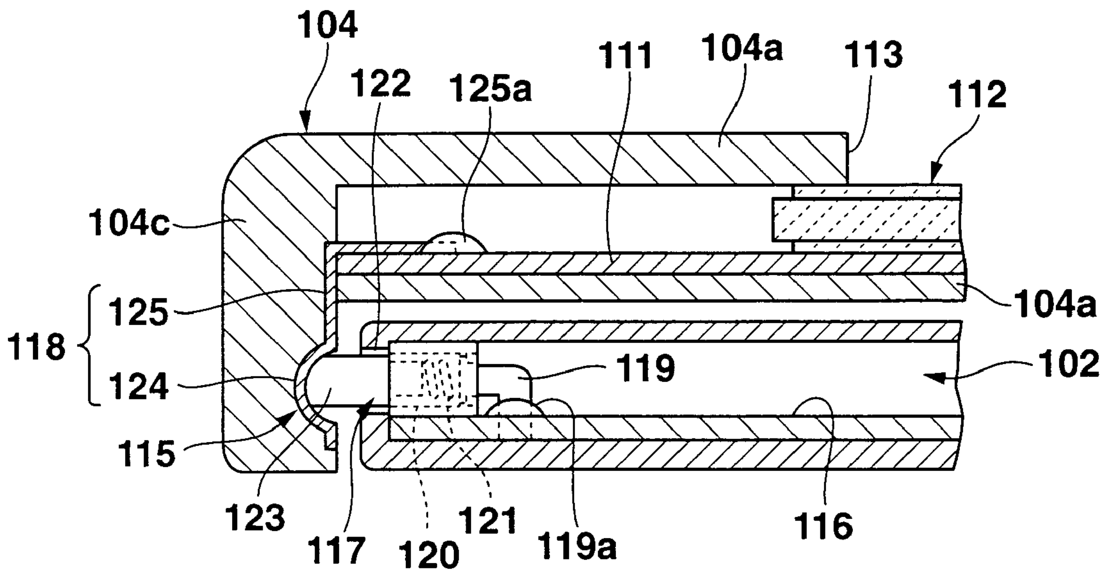
FIG. 44 is an enlarged sectional view of main portions of the cover member and the second case cut along a line C—C of FIG. 43.

As shown in FIGS. 43 and 44, the cover case 104 is formed in a nearly flat plate box shape made of a metal such as a stainless steel or a synthetic resin. The cover case 104 covers an outer surface 102*a* of the second case 102, another end surface 10*b* (upper side in FIG. 42) of a tip end portion (being positioned away from the hinge unit 103) of the second case 102, and both right and left lateral side surfaces 102*c* of the second case 102. That is, as shown in FIG. 43, the cover case 104 includes a flat plate portion 104*a* which covers the outer surface 102*a* of the second case 102, a tip end skirt 104*b* which covers the end surface 102*b* (upper side in FIG. 42) of the tip end portion of the second case 102, and both lateral side skirts 104*c* which cover both right and left lateral side surfaces 102*c* of the second case 102.

Additionally, as shown in FIGS. 43 and 44, the cover case 104 can perform an auxiliary function as an additional function. A circuit board 111 and an auxiliary display unit 112 are housed in the cover case 104. An electric and/or electronic circuit for performing the auxiliary function is mounted on the circuit board 111. The auxiliary display unit 112 electrically and optically displays auxiliary information such as time and a date, and comprises a planar display device such as a liquid crystal display device or an electroluminescence (EL) device as in the case of the display unit 106 of the second case 102. The auxiliary display unit 112 is electrically connected to the circuit board 111, and has a screen corresponding to an opening 113 formed in the outer surface of the cover case 104, and information displayed on the screen can be seen through the opening 113 from the external space. As shown in FIG. 43, a plurality of operation buttons 114 are disposed on the outer surface of the cover case 104, and the operation buttons 114 are used to select information to be displayed on the screen or a display state of the auxiliary display unit 112.

The cover case 104 is detachably mounted on the second case 102 by an electrically connecting/engaging unit 115. This electrically connecting/engaging unit 115 comprises a plurality of retractable electrically connecting/engaging portions 117 disposed in both right and left lateral side surfaces 102*c* of the second case 102, and a plurality of electrically connecting/engaging portions 118 disposed on both right and left lateral side skirts 104*c* of the cover case 104. By detachably engaging the plurality of retractable electrically connecting/engaging portions 117 of the second case 102 and the plurality of electrically connecting/engaging portions 118 of the cover case 104 with each other, the circuit substrate 111 in the cover case 104 is electrically connected to the circuit board 116 in the second case 102, and the cover case 104 is detachably mounted on the second case 102.

As shown in FIG. 44, each of the plurality of retractable electrically connecting/engaging portions 117 in the second case 102 comprises a fixed terminal 119 fixed by solder 119*a* to an electrode (not shown) on each of both lateral sides of the circuit board 116 positioned in the vicinity of both right and left lateral side surfaces 102*c* of the second case 102, a cylinder 120 fitted on an outer end of the fixed terminal 119, an urging member 121 housed in a hole of the cylinder 120, and a movable terminal 123 which has a base end portion inserted into the hole of the cylinder 120 and a tip end portion inserted in one of through-holes 122 formed in both lateral side surfaces 102*c* of the second case 102. The movable terminal 123 is urged by an urging force of the urging member 121 so that the tip end portion can project out from the through-hole 122. The movable terminal 123 can be retracted in the through-hole 122 against the urging force of the urging member 121 when the tip end portion is pressed.

The tip end portion of the movable terminal 123 is formed in a shape not to deteriorate an appearance of the second case 102 even when it is projected from the through-hole of one of the lateral side surfaces 102*c* of the second case 102. In this embodiment, the tip end portion of the movable terminal 123 has a semispherical shape.

As shown in FIG. 44, each of the plurality of electrically connecting/engaging portions 118 of the cover case 104 comprises an engaging indent 124 in which the tip end portion 123 of the movable terminal of each of the plurality of retractable electrically connecting/engaging portions 117 disposed in both right and left lateral side surfaces 104*c* of the cover case 104 is to be seated, and a wiring 125 extending from the inner surface of the engaging indent 124 to the circuit board 111 in the cover case 104. The extending end of the wiring 125 is fixed by solder 125*a* to an electrode (not shown) of the circuit board 111.

When the tip end portion of each of the plurality of movable terminals 123 of the second case 102 is pressed by the urging force of the urging member 121 onto each of the wirings 125 on the plurality of engaging indents 124 of the cover case 104, the tip end portion of each of the plurality of movable terminals 123 of the second case 102 mechanically engages with each of the wirings 125 on the engaging indents 124 of the cover case 104, and at the same time each of the plurality of movable terminals 123 of the second case 102 is electrically connected with each of the wirings 125 of the cover case 104 so that the circuit board 111 in the cover case 104 is electrically connected with the circuit board 116 in the second case 102.

Figure 45:
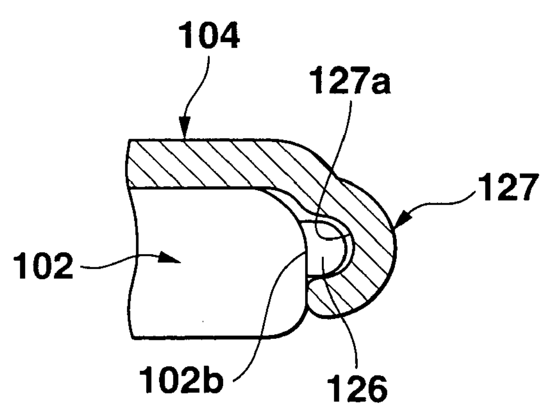
FIG. 45 is an enlarged sectional view of main portions of the cover member and the second case cut along a line D—D of FIG. 43.

As shown in FIG. 45, an engaging projection 126 is disposed at a position on the end surface 102*b* (upper side in FIG. 42) of the tip end portion of the second case 102, the position being middle in a thickness direction of the second case 102 and in the right and left lateral directions in FIG. 42 of the second case 102. The engaging projection 126 has a semicircular cross section and is thin and long in the lateral directions. The engaging projection 126 of the second case 102 provides decoration to the end surface 102*b* of the second case 102.

As shown in FIG. 45, an engaging portion 127 is disposed on the tip end skirt 104*b* (upper side in FIG. 43) of the cover case 104. The engaging portion 127 includes a projection projecting from the tip end skirt 104*b* (upper side in FIG. 43) of the cover case 104 and having a semicircular cross section as in the case of the engaging projection 126 on the end surface 102*b* of the second case 102. A concavity 127*a* is formed in an inner surface of the projection of the engaging portion 127, and the concavity 127*a* has the same shape and dimensions as those of the engaging projection 126.

Figure 46:
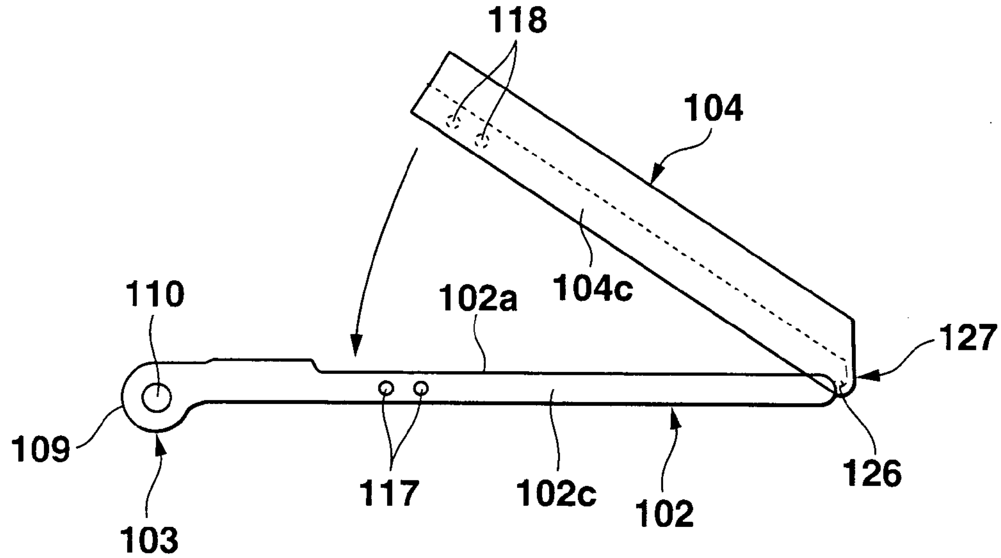
FIG. 46 is a side view showing a situation of mounting the cover member on the second case of FIG. 42.

Next, an operation for mounting the cover case 104 on the second case 102 will be described. As shown in FIG. 46, first, the concavity 127*a* of the engaging portion 127 disposed on the tip end skirt 104*b* of the cover case 104 is hooked on the engaging projection 126 disposed on the end surface 102*b* of the second case 102, so that the tip end skirt 104*b* is arranged to be overlapped on the end surface 102*b* of the second case 102. Then, in this state, the cover case 104 is rotated around the engaging projection 126 on the end surface 102*b* of the second case 102 toward the outer surface 102*a* of the second case 102. Then, as shown in FIG. 41, the planar portion 104*a* of the cover case 104 is arranged to be overlapped on the outer surface 102*a* of the second case 102, and both right and left lateral side skirts 104*c* of the cover case 104 are arranged to be overlapped on both right and left lateral side surfaces 102*c* of the second case 102. Then, the plurality of electrically connecting/engaging portions 117 on both lateral side surfaces 102*b* of the second case 102 are mechanically engaged with and electrically connected to the plurality of electrically connecting/engaging portions 118 on both lateral side skirts 104*c* of the cover case 104.

While the rotation of the cover case 104 toward the outer surface 102*a* of the second case 102, the semispherical tip end portions of the movable terminals 123 of the electrically connecting/engaging portions 117 of the second case 102 abut on the inner surfaces of the lateral side skirts 104*c* of the cover case 104 so that the movable terminals 123 are retracted into the second case 102 against the urging force of the urging members 121. Then, the semispherical tip end portions of the movable terminals 123 slide on the inner surfaces of the lateral side skirts 104*c* of the cover case 104. When the semispherical tip end portions of the movable terminals 123 reach at the wirings 125 on engaging inconcavities 124 of the electrically connecting/engaging portions 118 of the cover case 104, the tip end portions of the movable terminals 123 are pushed out by the urging force of the urging members 121 to press on and engage with the wirings 125 on the engaging indents 124 of the electrically connecting/engaging portions 118. At the same time, the movable terminals 123 of the electrically connecting/engaging portions 117 are brought into contact with the wirings 125 of the electrically connecting/engaging portions 118 so that the circuit board 111 in the cover case 104 is electrically connected to the circuit board 116 in the second case 102.

To remove the cover case 104 from the second case 102, the cover case 104 is pulled up in a separating direction from the outer surface 102*a* of the second case 102. While the cover case 104 is pulling up from the outer surface 102*a* of the second case 102, the tip end portions of the movable terminals 123 of the electrically connecting/engaging portions 117 which are separated from the wirings 125 on the engaging indents 124 of the electrically connecting/engaging portions 118 disposed on the lateral side skirts 104*c* of the cover case 104 are pressed by the inner surface of the side portion 104*c* of the cover case 104 and are retracted in the both lateral side surfaces 102*c* of the second case 102 against the urging force of the urging members 121. In this state, the cover case 104 is rotated around the engaging projection 126 on the end surface 102*b* of the second case 102 in the separating direction from the outer surface 102*a* of the second case 102, and then the cover case 104 is opened with respect to the second case 102 of the cover case 104. Finally, the concavity 127*a* of the engaging portion 127 disposed on the tip end skirt 104*b* of the cover case 104 is separated from the engaging projection 126 disposed on the end surface 102*b* of the second case 102 so that the tip end skirt 104*b* is removed from the end surface 102*b* of the second case 102.

According to such an electronic dictionary, when the first case 101 and the second case 102 are rotated around the hinge unit 103 to be closed each other with the cover case 104 mounting on the second case 102, the first case 101 and the second case 102 overlap each other to make the electronic dictionary compact as shown in FIG. 41. Thus, portability of the electronic dictionary of the embodiment can be improved. Further, the cover case 14 covering the outer surface 102*a* of the second case 102, the end surface 102*b* of the second case 102, and both right and left lateral side surfaces 102*c* of the second case 102 is not greatly bulged to the outside from the second case 102. Thus, an appearance and portability of the electronic dictionary is not deteriorated with the cover case 104 mounting thereon.

Further, even when the first case 101 and the second case 102 are rotated around the hinge unit 103 to be opened in order to use the electronic dictionary as shown in FIG. 40, the cover case 104 mounting on the second case 102 and not greatly bulging out from the second case 102 presents an usability of the electronic dictionary from lowering, and the electronic dictionary together with cover case 104 can be used well.

Further, according to the electronic dictionary, when the cover case 104 is mounted on the second case 102, the movable terminals 123 of the electrically connecting/engaging portions 117 disposed in the second case 102 are brought into contact with the wirings 125 of the electrically connecting/engaging portions 118 disposed in the cover case 104 and electrically connect the circuit board 111 in the cover case 104 and the circuit board 116 in the second case 102 with each other.

Thus, by operating the plurality of operation buttons 114 disposed in the cover case 104, the auxiliary display unit 112 of the cover case 104 can carry out various auxiliary functions, for example displaying auxiliary information such as time and a date in addition to various functions which the circuit board 116 in the second case 102 has, even when the first case 101 and the second case 102 are closed each other to be carried as shown in FIG. 41 or when the first case 101 and the second case 102 are opened each other to be used as shown in FIG. 40.

According to the electronic dictionary, only by rotating the cover case 104 toward the outer surface 102*a* of the cover case 104 after the concavity 127*a* of the engaging portion 127 on the tip end skirt 104*b* of the cover case 104 is hooked on the engaging projection 126 on the end surface 102*b* of the second case 102, the cover case 104 can be overlapped on the second case 102 to be mounted. Thus, the work for mounting the cover case 104 on the second case 102 is facilitated.

In this case, since the engaging portions 127 and the plurality of electrically connecting/engaging portions 118 on the tip end skirt 104*b* and both lateral side skirts 104*c* of the cover case 104 engage with the engaging projection 126 and the plurality of electrically connecting/engaging portions 117 on the end surface 102*b* and both lateral side surfaces 102*c* of the second case 102, the cover case 104 can be mounted on the second case 102 in a sure and stable state.

Furthermore, according to the electronic dictionary, since the semicircular cross section of the engaging projection 126 on the end surface 102*b* of the second case 102 and the semispherical shape of each of the tip end portions of the movable terminals 123 of the plurality of electrically connecting/engaging portions 117 on both lateral side surfaces 102*c* provide decoration to the second case 102, an appearance of the electronic dictionary is not deteriorated even when the cover case 104 is removed from the second case 102.

Thirteenth Embodiment

Figure 47:
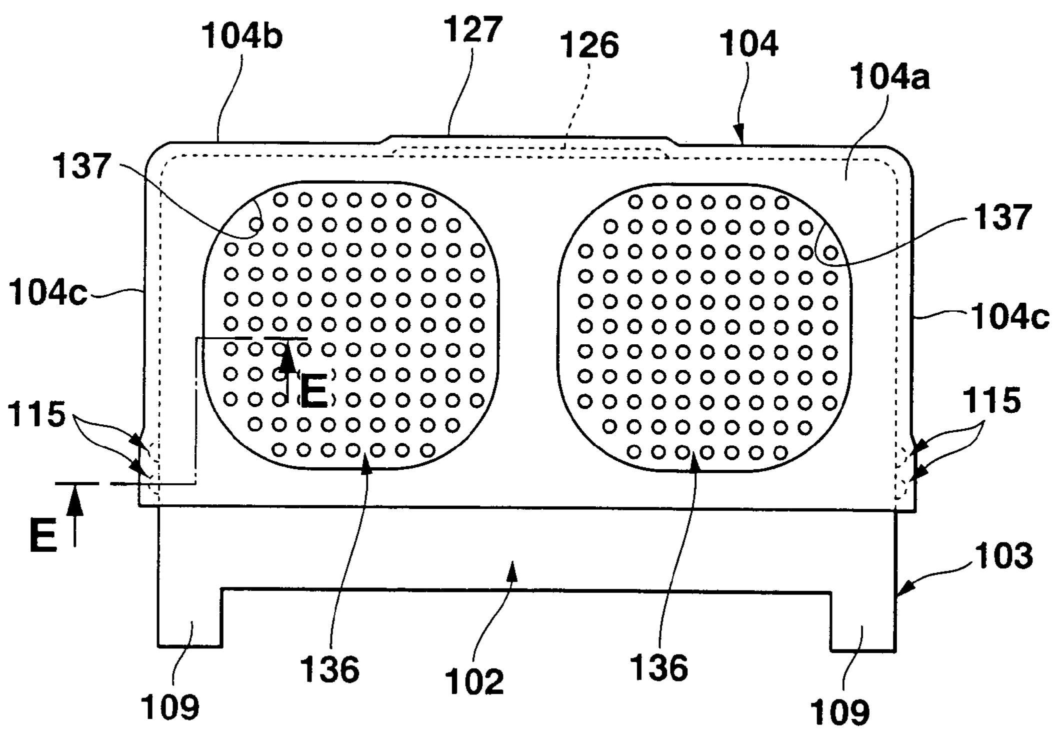
FIG. 47 is a front view showing a second case of an electronic dictionary of a thirteenth embodiment of the present invention in a cover member mounted state.
Figure 48:
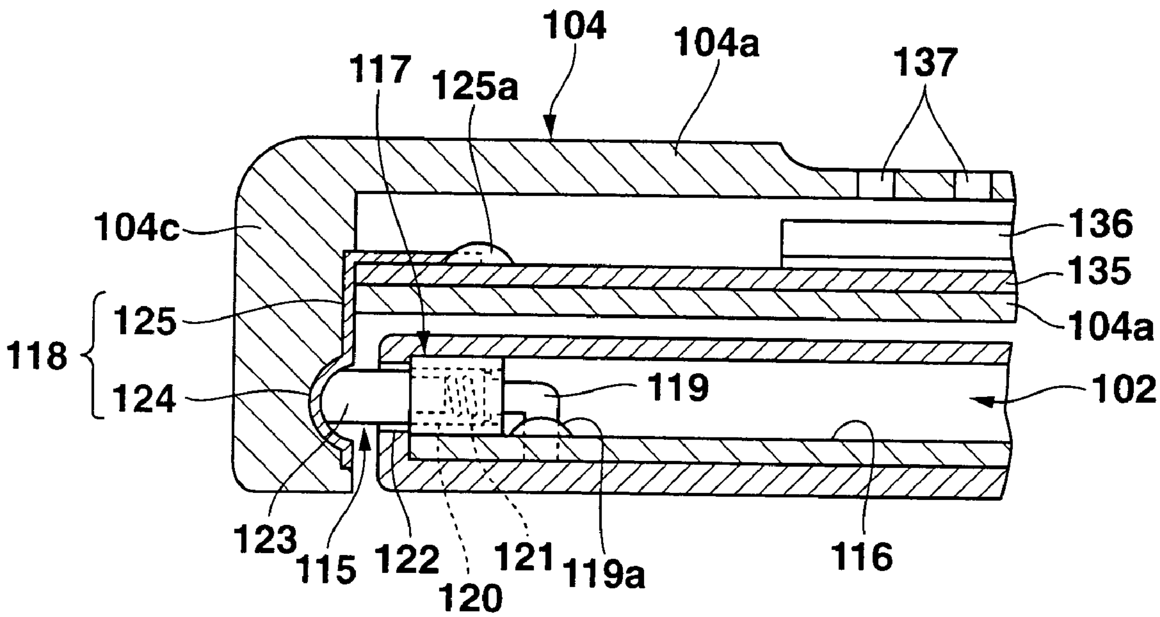
FIG. 48 is an enlarged sectional view of main portions of the cover member and the second case cut along a line E—E of FIG. 47.

Next, an electronic dictionary of a thirteenth embodiment of the present invention will be described with reference to FIGS. 47 and 48. Portions of the embodiment similar to those of the twelfth embodiment described above with reference to FIGS. 40 to 46 are denoted by the same reference numerals as those denoting the same portions of the twelfth embodiment, and detailed description thereof will be omitted.

In the electronic dictionary, a pair of speakers 136 are mounted in a cover case 104. Other components of the electronic dictionary of the thirteenth embodiment are the same as those of the twelfth embodiment. A circuit board 135 for the pair of speakers 136 is housed in the cover case 104. An electric and/or electronic circuit for performing the pair of speakers 136 is disposed on the circuit board 135, and wirings 125 of electrically connecting/engaging portions 118 are connected to predetermined electrodes (not shown) of the electronic circuit.

Each of the pair of speakers 136 is a planar type and is electrically connected to the circuit board 135 in the cover case 104. A vibration plate is exposed in a pair of openings 137 formed in an outer surface of the cover case 104. When the cover case 104 is mounted on the outer surface of the second case 102, a plurality of electrically connecting/engaging portions 117 disposed in the second case 102 and a plurality of electrically connecting/engaging portions 118 disposed in the cover case 104 are mechanically engaged with and electrically connected to each other so that a circuit board 116 disposed in the second case 102 and the circuit board 135 disposed in the cover case 104 are electrically connected with each other.

According to such an electronic dictionary, technical advantages similar to those of the twelfth embodiment can be provided. Moreover, an user of this embodiment can listen to music and voices through the pair of speakers 136 disposed in the cover case 104 mounted on the second case 102.

According to the twelfth and thirteenth embodiments, the auxiliary function units mounted on the cover cases are the display unit and the speakers. However, the auxiliary function unit mounted on the cover case can be structured for functioning as at least one of various other function units such as a television tuner unit, a power source unit, a camera unit, a printer unit, a scanner unit, and the like.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An electronic device comprising:

a first case in which a keyboard is provided;

a second case in which a display unit is provided;

a hinge unit which connects the first and second cases to each other such that the first and second cases are openable and closeable;

a cover member for decoration which is mounted on an outer surface of the second case;

a first engaging mechanism which is disposed on the second case and has a decorative shape; and a second engaging mechanism which is disposed on the cover member to be engaged with the first engaging mechanism;

wherein the first engaging mechanism comprises:

a first engaging portion, which comprises a projection, provided at a tip end surface of the second case at an opposite side of the second case from the hinge unit; and second engaging portions provided near to the hinge unit on both side surfaces of the second case;

wherein the second engaging mechanism comprises:

a first engaging portion provided at a tip end surface of the cover member at an opposite side of the cover member from the hinge unit; and second engaging portions provided near to the hinge unit on both side surfaces of the cover member;

wherein positions of the first and second engaging portions of the second engaging mechanism correspond to positions on the second case of the first and second engaging portions of the first engaging mechanism; and wherein the first engaging portion of the second engaging mechanism projects from the tip end surface of the cover member and defines a concavity which engages the projection of the first engaging portion of the first engaging mechanism when the second engaging mechanism is engaged with first engaging mechanism; and wherein the cover member is detachably mounted on the outer surface of the second case by engaging the first and second engaging portions of the first engaging mechanism with the first and second engaging portions of the second engaging mechanism, respectively.

2. An electronic device according to claim 1, wherein at least one of: (i) one of the second engaging portions of the second case and (ii) one of the second engaging portions of the cover member is elastically movable in engaging/disengaging directions.

3. An electronic device according to claim 1, wherein a decoration is disposed on an outer surface of the second case, and an opening is formed in a portion of the cover member at a position corresponding to the decoration on the outer surface of the second case.

4. An electronic device according to claim 3, wherein the decoration includes at least one of a symbol, a graphic and a pattern.

5. An electronic device according to claim 1, wherein a decoration is disposed on an outer surface of the second case, and a light transmitting member is disposed in a portion of the cover member at a position corresponding to the decoration on the outer surface of the second case.

6. An electronic device according to claim 5, wherein the decoration includes at least one of a symbol, a graphic and a pattern.

7. An electronic device according to claim 1, wherein the cover member is made of a synthetic resin which transmits light.

8. An electronic device comprising:

two cases;

a hinge unit which connects the two cases to each other such that the two cases are openable and closeable;

a cover member for decoration which is mounted on an outer surface of at least one of the two cases;

a first engaging mechanism which is disposed in the at least one of the cases; and a second engaging mechanism which is disposed in the cover member to be engaged with the first engaging mechanism;

wherein the cover member is detachably mounted on the outer surface of the at least one of the cases by engaging the first and second engaging mechanisms with each other;

wherein the first engaging mechanism includes engaging portions which are disposed at positions away from the hinge unit on both side surfaces of the at least one of the cases and engaging portions which are disposed at positions near to the hinge unit on said both side surfaces of the at least one of the cases;

wherein the second engaging mechanism includes engaging portions which are disposed at positions away from the hinge unit on both side surfaces of the cover member and engaging portions which are disposed at positions near to the hinge unit on said both side surfaces of the cover member; and wherein the engaging portions of the first engaging mechanism that are disposed at positions away from the hinge unit are rotatable engaged with the engaging portions of the second engaging mechanism that are disposed at positions away from the hinge unit.

9. An electronic device according to claim 8, wherein a mirror is disposed on an inner surface of the cover member facing the outer surface of the at least one of the cases.

10. A cover member for an electronic device, wherein the electronic device comprises: (i) a first case in which a keyboard is provided, (ii) a second case in which a display is provided, (iii) a hinge unit connecting the first case and the second case to each other to be openable and closeable, and (iv) a first engaging mechanism which is disposed on the second case, has a decorative shape, and comprises a first engaging portion, which comprises a projection, provided at a tip end surface of the second case at an opposite side of the second case from the hinge unit, and second engaging portions provided near to the hinge unit on both side surfaces of the second case, and wherein the cover member is mountable to an outer surface of the second case, said cover member comprising:

a second engaging mechanism which comprises:

a first engaging portion provided at a tip end surface of the cover member at an opposite side of the cover member from the hinge unit; and second engaging portions provided near to the hinge unit on both side surfaces of the cover member;

wherein positions of the first and second engaging portions of the second engaging mechanism correspond to positions on the second cover of the first and second engaging portions of the first engaging mechanism; and wherein the first engaging portion of the second engaging mechanism projects from the tip end surface of the cover member and defines a concavity which engages the protection of the first engaging portion of the first engaging mechanism when the second engaging mechanism is engaged with first engaging mechanism;

wherein the cover member is detachably mounted on the outer surface of the second case by engaging the first and second engaging portions of the first engaging mechanism with the first and second engaging portions of the second engaging mechanism, respectively.

11. A cover member according to claim 10, wherein a decoration is disposed on a part of the outer surface of the second case, and an opening is formed in a portion of the cover member at a position corresponding to the decoration on the outer surface of the second case.

12. A cover member according to claim 11, wherein the decoration includes at least one of a symbol, a graphic and a pattern.

13. A cover member according to claim 10, wherein a decoration is disposed on a part of the outer surface of the second case, and a light transmitting member is disposed in a portion of the cover member at a position corresponding to the decoration on the outer surface of the second case.

14. A cover member according to claim 13, wherein the decoration includes at least one of a symbol, a graphic and a pattern.

15. An electronic device comprising:

two cases;

a hinge unit which connects the two cases to each other and by which the two cases are openable and closeable;

an electronic unit disposed in at least one of the two cases;

a flat-shaped cover member which is mounted to at least one of the cases and is overlapped with an outer surface of at least one of the cases to cover the outer surface;

an electronic unit disposed in the cover member; and an electrically connecting/engaging unit which detachably engages at least one of the cases and the cover member with each other, and electrically connects the electronic unit in at least one of the cases and the electronic unit in the cover member with each other.

16. An electronic device according to claim 15, wherein the electrically connecting/engaging unit comprises a first electrically connecting/engaging portion which is electrically connected to the electronic unit in at least one of the cases and is retractably projected from at least one of both side surfaces of at least one of the cases, a second electrically connecting/engaging portion which is electrically connected to the electronic unit in the cover member and is disposed on at least one of both side surface of the cover member, and the first electrically connecting/engaging portion is detachably engaged with the second electrically connecting/engaging portion.

17. An electronic device according to claim 15, wherein a first engaging portion is disposed on a tip end surface of at least one of the cases, the tip end surface being positioned opposite to the hinge unit on at least one of the cases; and a second engaging portion with which the first engaging portion is detachably engaged is disposed on a tip end surface of the cover member, the tip end surface being positioned opposite to the hinge unit on the cover member.

18. An electronic device according to claim 15, wherein the electronic unit has one of a display function, a television tuner function, a speaker function, a power source function, a camera function, a printer function, and a scanner function.

* * * * *